United States Patent [19]

Kheradpir

[11] Patent Number: 4,979,118
[45] Date of Patent: Dec. 18, 1990

[54] PREDICTIVE ACCESS-CONTROL AND ROUTING SYSTEM FOR INTEGRATED SERVICES TELECOMMUNICATION NETWORKS

[75] Inventor: Shaygan Kheradpir, Brookline, Mass.

[73] Assignee: GTE Laboratories Incorporated, Waltham, Mass.

[21] Appl. No.: 321,710

[22] Filed: Mar. 10, 1989

[51] Int. Cl.[5] .............................................. H04M 7/06
[52] U.S. Cl. ................................... 364/436; 379/220; 340/827; 370/54
[58] Field of Search ....................... 364/436, 148, 149; 379/219-221; 340/827, 54

[56] References Cited

U.S. PATENT DOCUMENTS

| | | | |
|---|---|---|---|
| 4,669,113 | 5/1987 | Ash et al. | 379/221 |
| 4,756,019 | 7/1988 | Szybicki | 379/221 |
| 4,788,721 | 11/1988 | Krishnan et al. | 379/221 |
| 4,809,318 | 2/1989 | Schoute | 379/279 |
| 4,862,496 | 8/1989 | Kelly et al. | 340/827 |
| 4,873,517 | 10/1989 | Baratz et al. | 379/220 |
| 4,931,941 | 6/1990 | Krishnan | 379/220 |

OTHER PUBLICATIONS

"Dynamic Routing for Intercity Telephone Networks", by W. H. Cameron, J. Regnier, P. Galloy, A. M. Savoie, Tenth International Teletraffic Congress, Jun. 1983, Session No. 3.2., Paper No. 3, p. 8.
PARS-A Predictive Access-Control and Routing Strategy for Real-Time Control of Communications Networks, by Shaygan Kheradpir, Proceeding of Network Management and Control Workshop, Sep. 1989, Tarrytown, NY.

Primary Examiner—Parshotam S. Lall
Assistant Examiner—Michael Zanelli
Attorney, Agent, or Firm—James J. Cannon, Jr.; Victor F. Lohmann, III

[57] ABSTRACT

A predictive access-control and routing system for a telecommunications network operating in uncertain environments and capble of handling heterogeneous traffic. The system is a real-time, state-dependent network traffic control system in which the control strategy is a function of both real-time congestion levels and real-time traffic profiles. At specific time epochs, the system, using real-time measurements of source-destination arrival dates and trunk group link occupancies, generates predictions of all network trunk group occupancy levels for the next epoch as a function of routing and access control. It then minimizes a projected cost function, such as blocking, to generate a traffic control policy to be implemented during the next time interval.

31 Claims, 10 Drawing Sheets

LEGEND:
- — — → — A PRIORI DEFINED ROUTES
- ← — — → TCAP
- ← — — — → SIGNALING LINKS CCS
- ← — · — → STANDARD TMN INTERFACES

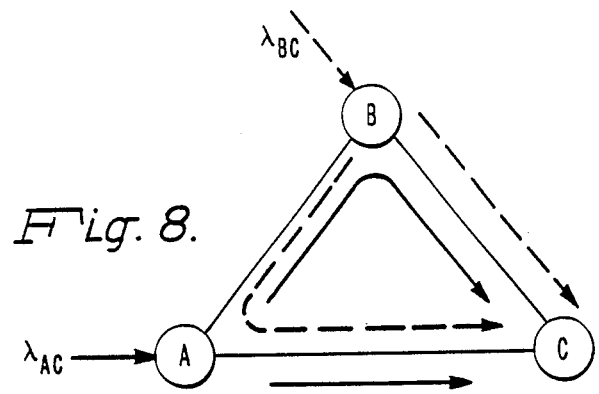
Fig. 8.
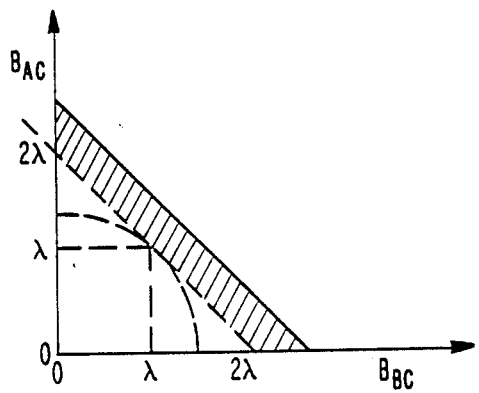
Fig. 9.
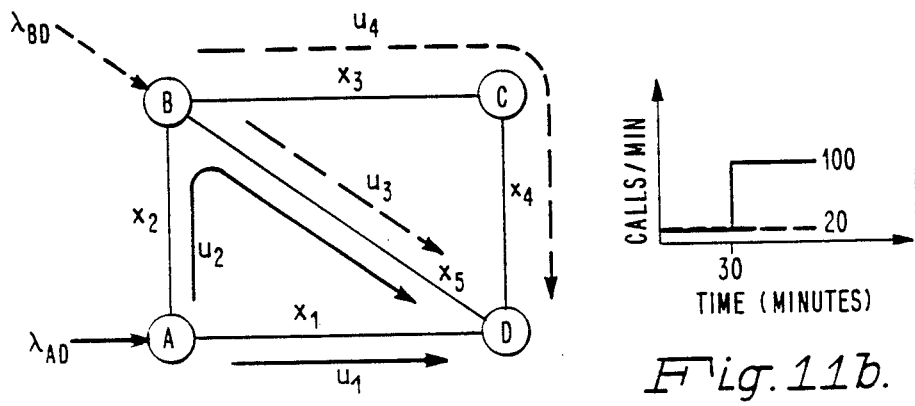
Fig. 11a.
Fig. 11b.

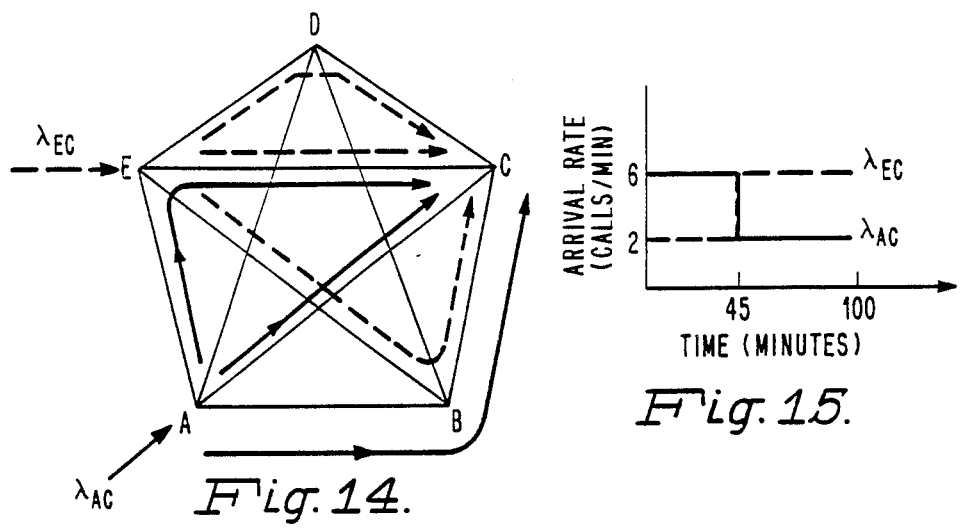
Fig. 14.
Fig. 15.
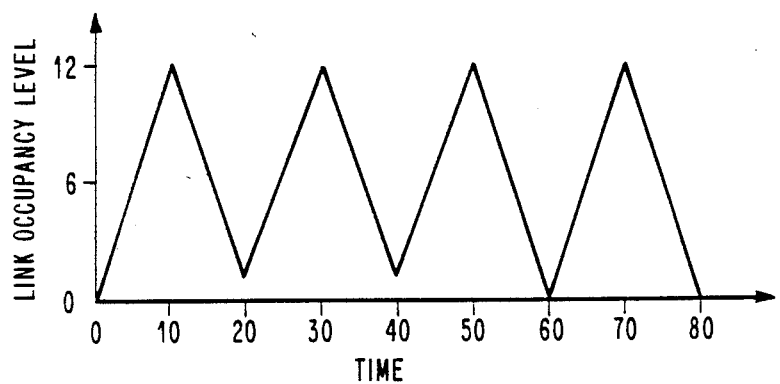
Fig. 16.
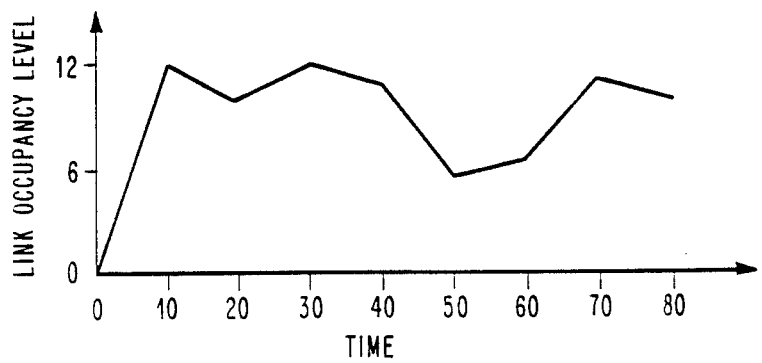
Fig. 17.

PREDICTIVE ACCESS-CONTROL AND ROUTING SYSTEM FOR INTEGRATED SERVICES TELECOMMUNICATION NETWORKS

BACKGROUND OF THE INVENTION

This application pertains to the field of telecommunications, and in particular to network management and control systems. Specifically it discloses a real-time, state-dependent network traffic control system for an integrated services telecommunications network capable of handling heterogeneous traffic environments, in which the control strategy is a function of both real-time congestion levels and real-time traffic profiles. The invention includes a predictive algorithm which controls access to the network and routes traffic through the network, while minimizing in real time a weighted function of the projected blocked traffic.

The promise of an Integrated Services Network (ISN) is based, primarily, on three recent developments in the telecommunication industry. The first is the evolution of high capacity network components. Today, fiber optic cables can transmit billions of bits of information per second. Furthermore, the introduction of digital exchanges with multi-rate switching capability of hundreds of thousands of calls per hour is not far away. The second is the proliferation of fast (multi-mega instructions per second) computer systems and sophisticated operation systems (OSs). And finally, there is the consistent progress in the development of standard protocols between network users and service access entities, and between the service entities distributed in the network. However, the control (i.e., routing and access-control) of services in an ISN environment is a fundamental problem that has, until recently, attracted little attention in the literature.

The Public Switched Telephone Network (PSTN) of today is designed for a relatively static traffic environment: 3 Khz of bandwidth; 3 minute average holding time; and 3 CCS (hundred call seconds per hour) busy hour traffic per line. Accordingly, traffic control policies in the PSTN are static and open-loop in nature. A typical traffic control procedure is as follows: the day is divided into a number of time periods, during which the traffic patterns are well understood, and a different set of pre-planned control schemes is devised for each period. Network management activities override the pre-planned control schemes in case of "rare" events such as failures or when traffic levels exceed the designed thresholds.

FIG. 1 is a block diagram of a typical network control structure presently in use. Such a system utilizes auxiliary automatic and manual control techniques for network management based on experience and intuition. Typically, the routing scheme for a given network is preplanned according to an expected offered load in a given period and for a given network topology. As shown in FIG. 1, weekly or bi-weekly traffic reports are analyzed in block 10, yielding predicted traffic demands which are optimized in box 12 to serve the network 14. Exception reports of rare events such as failures or major overloads are signaled from the network 14 to the network management 16, where they are examined and heuristic adjustments are made to the preplanned control policy of network 14.

A number of factors suggest that the static, open-loop method of network control may be inappropriate for the increasingly volatile homogeneous or heterogeneous traffic environments of the future. (i) The traffic demands on today's network are becoming more dynamic and less predictable as a result of (1) the introduction of a plethora of services such as Enhanced 800 and Private Virtual Networks; (2) erratic behavior of customer premises equipment (CPE) such as automatic redialers; and (3) structural changes to the message transport network such as the addition of a separate common channel signaling network.

For example, a network equipped with common channel signaling (CCS) capabilities may encounter a novel problem: when CCS is employed on a trunk group (TG), ineffective call attempts can potentially be disposed of in as little as 125 milliseconds (or 28,800 calls per hour per circuit) as opposed to 20 seconds (or 180 calls per hour per circuit) for calls that are handled using in-band signaling. The enormous expansion of the domain of possible arrival rates leads naturally to a more volatile traffic environment.

(ii) The present day telecommunication network, unlike the one of the past, does not operate in isolation; the profile of the internally generated traffic may be well understood but the characteristics of exogenous traffic, generated by neighboring Local Access Transport Areas (LATAs) or Inter-Exchange Carriers (ICs), may not.

(iii) Transient bursts in the load of particular services, even if short-lived, cannot be ignored anymore. (Brokers attempting to trade stocks during a market crash will testify to this!)

(iv) Long-term traffic demands for such services as multi-media connections (voice/data/video), multi-point connections, etc. are largely unknown. For example, if the ISN should provide the transport for Community Antenna TV (CATV), consider the challenge of forecasting set-up attempt rates due to customers switching TV channels on any given night.

(v) In the past network efficiency has been limited by the switching and transmission capacity of network elements (NEs). Consequently, networks were characterized by small trunk sections and high inter-exchange connectivities, resulting in a high degree of resiliency. Today, we can dramatically improve network efficiency, for example, by replacing a number of copper TGs with a single fiber optic cable. However, the transition to a more efficient network will sacrifice resiliency, if the network is controlled in the static open-loop mode.

In the past few years a number of dynamic routing schemes have been proposed, in part, to address some of the issues outlined above. The two foremost of these schemes are Dynamically Controlled Routing (DCR) and Dynamic Non-Hierarchical Routing (DNHR).

Dynamic routing methods adjust traffic flow in a network as a function of network states. The most advanced of these methods is Bell Northern Research's "Dynamically Controlled Routing" (DCR), described in "Dynamic Routing for Intercity Telephone Networks", W. H. Cameron et al., Proceeding of ITC-10, Montreal, 1983.

DCR is a centralized, adaptive routing scheme. In a network controlled by DCR, every originating call has a number of pre-defined routes (tandem and direct) which it can take to its destination, with tandem routes being comprised of two links. In the DCR environment the network exchanges periodically relay (every 10 seconds) trunk group (TG) utilization levels to a central network processor. Using the TG utilizations and capacities in conjunction with the pre-defined routing topology, the network processor computes a set of tandem recommendations, in the form of routing probabilities, for each source-destination (SD) pair in the network. The network processor then sends a set of tandem recommendations back to the exchanges to update their routing tables. The recommendations are based primarily on the excess capacity of the tandem routes at the time of measurement. Although the network processor possesses real-time, global state information, the routing decisions for each SD pair are made independently of all other pairs. The network exchanges use the tandem recommendations in the following manner: when a call arrives at a source exchange it is automatically offered to the direct route; if the direct route is full, one of the remaining tandem routes will be chosen based on the probabilities in the routing table.

A well-known routing algorithm, which is not a network management and control system, is "Dynamic Non-Hierarchical Routing" (DNHR), developed by Bell Laboratories. This algorithm is believed to be in operational use today in some networks. In its original form, DNHR does not operate in real-time. Furthermore, DNHR is not able to react to call-processor congestion and network element failure. Recently, DNHR has been enhanced with limited real-time routing capabilities, which are, in principle, similar to "Dynamic Controlled Routing" (DCR), described infra. DNHR is described by Ash et al., "Design and optimization of networks with dynamic routing", Bell System Technical Journal, pp. 1787–1820, October 1981. The enhanced DNHR is disclosed in U.S. Pat. No. 4,669,113. Enhanced DNHR is also believed to be operational in some networks.

DNHR is a time-dependent routing scheme which capitalizes on differing time zone trunk usage by dividing the day into 10 time periods and using a different set of pre-planned routing sequences for each time period. The routing sequences reflect the optimal routes for calls to complete upon, based upon extensive operational measurement data, which is periodically provided by each participating exchange to the central network management system. The routing tables and network configuration are reviewed and evaluated by a centralized automated data collection and processing system. This system evaluate the exchange data in weekly and semi-weekly periods. DNHR reacts to real-time overloads (signified by SD blockings exceeding certain thresholds) by altering the pre-planned routing sequences in a manner similar to DCR.

Supplementing routing algorithms discussed supra, auxiliary automatic and manual control techniques provide recommendations for network management based upon experience and intuition. Typically, the routing scheme for a given network is pre-planned according to an expected offered load in a given period and for a given network topology. The routing scheme is then designed accordingly to satisfy a nominal performance objective. Whenever the offered load exceeds the expected level or the network topology changes due to a failure, the pre-planned routing scheme must be altered accordingly; the auxiliary network control scheme assumes this responsibility. However the auxiliary network controller's routing policy is designed to alleviate the overload or the failure problem: it does not, and is not designed to recommend control policies which achieve the nominal routing objectives.

As the size and the complexity of networks grow, it becomes difficult, if not impossible, to solely rely on intuition for network management decisions. For a fully connected 10-node network there are 90 source-destination pairs. If there are 3 routes assigned for each pair, there will be 270 traffic routes that must be monitored and controlled simultaneously in real-time. For a 20-node network (with 3 routes per source-destination pair) there are 1140 traffic routes to be controlled simultaneously.

If routing decisions are based on heuristics, there is no guarantee that they are optimal or even desirable solutions to the problem. In a heuristic system, recommendations are derived in isolation from nominal routing objectives, such as minimum blocking.

Although the traffic routing schemes discussed above are, to a certain degree, capable of reacting to real-time changes in traffic patterns, neither is truly designed to operate in volatile or extreme traffic conditions. Both DCR and DNHR only allow the use of two-link routes and prefer direct routes. However, long routes (of three or more links are frequently used to bypass failures, and the customary notions of direct and alternate routes do not apply to volatile situations. In such conditions, both algorithms rely on network management activities for network control. However, these network management recommendations are based typically on heuristics that do not, in general, follow the nominal traffic control objectives. Another shortcoming of these algorithms is that they are designed for homogeneous traffic environments. Consequently they are inappropriate control strategies for the ISNs accommodating heterogeneous traffic.

The routing recommendations devised by DCR and DNHR are based on the instantaneous traffic conditions in the network. Thus, they react to volatile conditions, rather than avoid them.

The most recent patent from the evolving methods of DNHR, U.S. Pat. No. 4,788,721, Nov. 29, 1988, issued Krishnan et al., discloses a method for routing traffic over a voice network uses some state measurements and estimates of future blockings, but principally on a source-destination basis rather than on a network bases. Krishnan's routing scheme calculates source-destination arrival rates every ½ to 2 hours. Consequently, it cannot control real-time surges in traffic, and hence, it is not an appropriate control strategy for the highly volatile traffic environments of the ISNs. Krishnan's routing strategy is limited to the control of voice-only networks.

Krishnan's routing algorithm projects the short-term gain for each individual source-destination pair, as a function of routing. Consequently, Krishnan's routing algorithm (i) does not yield optimal network behavior, as different SD pairs may compete for network resources, as opposed to cooperate to achieve optimal network performance; (ii) is not able to control access to network resources in a manner so as to reject the less revenue-generating calls at the expense of the more expensive ones; (iii) has to measure link occupancy levels and compute the control strategy for each call. This is considered prohibitive overhead for today's or even the foreseeable future's network switches.

SUMMARY OF THE INVENTION

The principal object of the present invention is to provide a predictive access-control and routing strategy for the real-time control and management of integrated services telecommunications networks which accommodate heterogeneous traffic.

It is another object of the invention to minimize, in real time, a weighted function of the projected (in time) source-destination blockings through a combination of routing and access strategies.

It is a further object of the invention to minimize the number of blocked calls, recognizing priorities of different traffic types and maximizing the revenue mix of traffic served.

Another object of the invention is to provide a real-time, centralized network management system so that cooperation among different source-destination pairs is guaranteed.

It is a further object of the invention to provide such a strategy which both controls access to a network and routes traffic through said network simultaneously.

It is still a further object of the invention to provide such a system in which access and routing decisions are based on projected network states, rather than on instantaneous states.

The predictive access-control and routing strategy (PARS) of the present invention is a real-time centralized network control system. Its operational objective is to minimize, in real-time, a weighted sum of the source-destination blockings through a combination of routing and access-control strategies. The weight attached to calls of a particular source-destination pair is specified by the service provider: in this manner different priorities can be assigned to different traffic types. This system uses real-time information about the traffic condition in the network to arrive at its decision.

Each intelligent, software controlled switch in a network is connected via a data link to a central computer located in the Network Control Center (NCC). Every $\Delta T$ time units each switch sends the current state (number of busy circuits) of its outgoing trunk groups to the NCC. The length of the sampling period $\Delta T$ is a function of the average holding time of a specific traffic type; for example, for voice calls with an average holding time of five minutes, $\Delta T$ is set to five minutes. In networks carrying nonhomogeneous traffic types, $\Delta T$ is determined by the shortest of the average holding times.

In addition to instantaneous link occupancies, the source node provides the NCC with the number of attempts to a particular destination during the past interval. A data network such as the Telecommunication Management Network (TMN) channel signaling system is used to transport this information to the NCC.

For every source-destination pair SD there are a set of a priori defined routes, the routing topology. Using the instantaneous link occupancy measurements, source-destination arrival rate information, the network topology, and the routing topology, the PARS control algorithm predicts the estimated source-destination arrival rates for the succeeding time interval and then the number of busy circuits on each link in the network at the end of the succeeding time interval as a function of routing and access-control.

Next, the traffic control variables are calculated for each source-destination pair for the upcoming interval. The traffic control variables specify the proportion of the incoming traffic to be offered to each route of a particular source-destination pair. The resulting control policy, dictated by the traffic control variables, minimizes the projected network blocking until the next measurement epoch. Finally, the NCC sends its recommendations back to the respective switches, which then update their routing tables.

The traffic control variables determine the proportion of the incoming traffic to be assigned during the upcoming period to each route of a particular source-destination pair. The controls are implemented as follows. When a call arrives at a source node, it must be offered to the proper outgoing route as determined by the traffic control variables. To implement this, the interval between real numbers 0 and 1 is divided into sub-intervals. The length of each sub-interval is equivalent to the magnitude of each traffic control variable of the particular source-destination pair.

Next, a random number between 0 and 1 is generated according to a uniform distribution. The interval in which the value of the random number falls determines the route, which in turn determines the proper outgoing link for that call.

It should be emphasized that the traffic control variables of a source-destination pair may sum to a value less than 1. This means that a certain number of calls will be rejected outright, i.e., no attempt will be made to hunt for a free circuit. A call will be blocked at the source node when the generated random number falls outside the union of the traffic control variables' intervals.

BRIEF DESCRIPTION OF THE DRAWINGS

FIG. 5b is the arrival rate profile for FIG. 5a;

FIG. 8 is a diagrammatic illustration of three node network to illustrate a problem in optimization;

FIG. 9 is a plot of solutions to the problem of FIG. 8;

FIGS. 11a and 11b are diagrams of a four node network for a simulated example highlighting the real-time traffic control capability of the algorithm;

FIGS. 14–17 illustrate a second example of a call rate for a five node network comparing link occupancy levels for the present invention and the prior art;

DESCRIPTION OF THE PREFERRED EMBODIMENT

This invention is a predictive access-control and routing strategy (PARS). which is a novel traffic control scheme, contrived to operate in uncertain network environments. PARS is a real-time, state-dependent network traffic control scheme in which the control strategy is a function of both real-time (instantaneous) congestion levels and real-time (running average) traffic profiles. Traffic profiles are characterized by their average holding times and arrival rates, computed in real-time.

PARS is a state-dependent centralized network control system. The operational objective of PARS is to minimize, in real-time, a weighted function of the projected (in time) source-destination (SD) blockings through a combination of routing and access-control strategies. The weights attached to calls of a particular SD pair are specified by the service provider; in this manner the network provider may define varying network objectives. For example to minimize the number of blocked calls, the estimated SD arrival rates are used as weights: to maximize revenue, the weights are assigned in proportion to tariff rates for each call-class.

Network Control Architecture

Although PARS can control the present day telecommunication network (equipped with CCS), we choose to explain the operational principles of the algorithm within the context of an Intelligent Network (IN) architecture for two reasons. First, the traffic control structure of today's telecommunication network is based on the 3/3/3 traffic profile mentioned in the Background. Consequently, the implementation of a real-time controller such as PARS would be awkward. Second, dynamic control of a heterogeneous traffic environment accommodating a deep penetration of, for example, multi-media services is not possible with the current telecommunication control structure, where call control and connection control of services are integrated.

Figure 1:
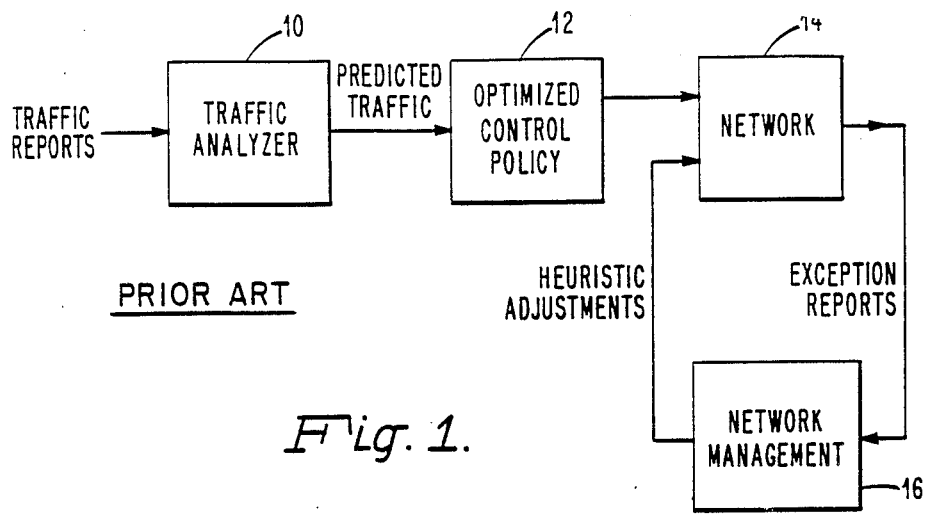
FIG. 1 is a block diagram of public switched telephone network control structure in use today.
Figure 2:
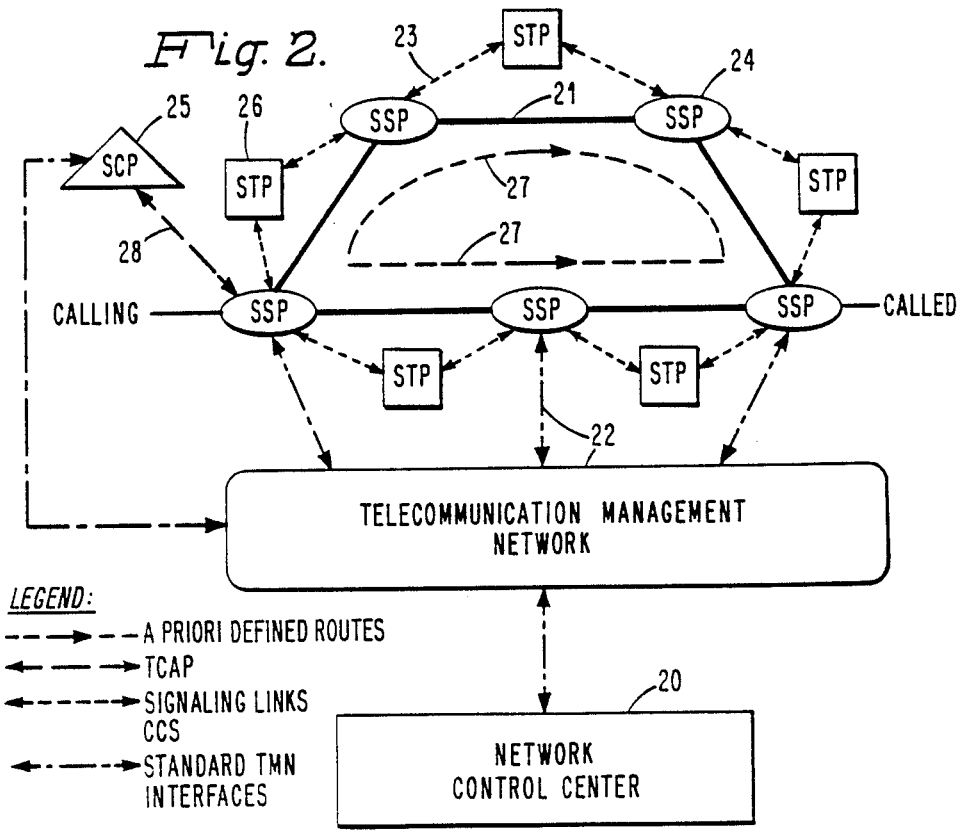
FIG. 2 is a diagrammatic illustration of the operational principles of the present invention within the context of an intelligent network architecture.

FIG. 2 illustrates the operational principles of PARS within the context of an IN architecture. There are three separate, but interconnected networks represented in FIG. 2: the message transport network 21, the CCS network 23, and the Telecommunication Management Network (TMN) 22. The message transport network 21 carries user-to-user information; the signaling network 23 transports service setup and tear down messages; and the TMN 22 acts as the transport for service control related messages between the network elements (NEs) and the operating systems (OSs). The NEs in FIG. 2 are the service switching points (SSP) 24 which are responsible for connecting an incoming circuit to an outgoing circuit: the service control point (SCP) 25 in charge of call control and the signal transfer point (STP) 26 in charge of routing the signaling messages to the proper SSPs or SCPs. For purposes of this specification, the SSPs, SCPs and STPs will all be considered as intelligent switches.

Stored at the network control center (NCC) is the physical topology of the network, and a set of a priori defined routes, the routing topology for each source-destination (SD) pair together with their respective traffic control variables. The traffic control variables determine the proportion of the incoming traffic to be assigned, during the upcoming period to each route of a particular SD pair. Consequently the sum of the control variables for each SD pair lies on the real interval [0.1].

Every $\Delta$time units, each SSP 24 sends its current state to the NCC 20 through the TMN 22, where the state is defined as the number of busy circuits on its outgoing trunk groups (TGs). In addition to instantaneous link occupancies, each source SSP 24 transmits to the NCC 20 the number of service requests from it as a source to all network destinations during the preceding time interval. Using the instantaneous TG occupancy levels, the service attempt rates for each SD pair in the network the network topology, and the routing topology. PARS projects $\Delta T$ time units ahead, the future TGs occupancy levels as a function of routing and access-controls. At this point in the algorithm the TGs are assumed to have unlimited capacity. Based on the state projections, PARS then computes a control policy that would result in "optimal" network behavior during the upcoming interval. The NCC 20 then relays the new control policy in the form of traffic control variables, to the network SCPs 25. These control variables specify the proportion of the incoming traffic to be assigned to each route.

When a source SSP 24 receives a service request message, it transmits the message to its designated SCP 25 for treatment using the Transaction Capabilities Application Part (TCAP) 28 of the Signaling System No. 7 (SS7). The SCP 25' according to the particular service's traffic control variables, either recommends a complete route to the destination or rejects the service. If the service request is accepted, then the source SSP 24 inserts the TG identifications that comprise the recommended route in the Initial Address Message (IAM). and transmits the signaling message using the ISDN User Part of the SS7 protocol. Consequently, the tandem SSPs 24 attempt to setup the route as described in the IAM and do not reprocess the service request.

In the event that the SSPs 24 are unable to locate an idle circuit on the designated TG. an Unsuccessful Backward Setup Message (UBSM) is transmitted to the source SSP. which in turn, passes it along to its designated SCP 25. The SCP 25 will then either reject the service request or recommend another route to the destination.

Figure 3:
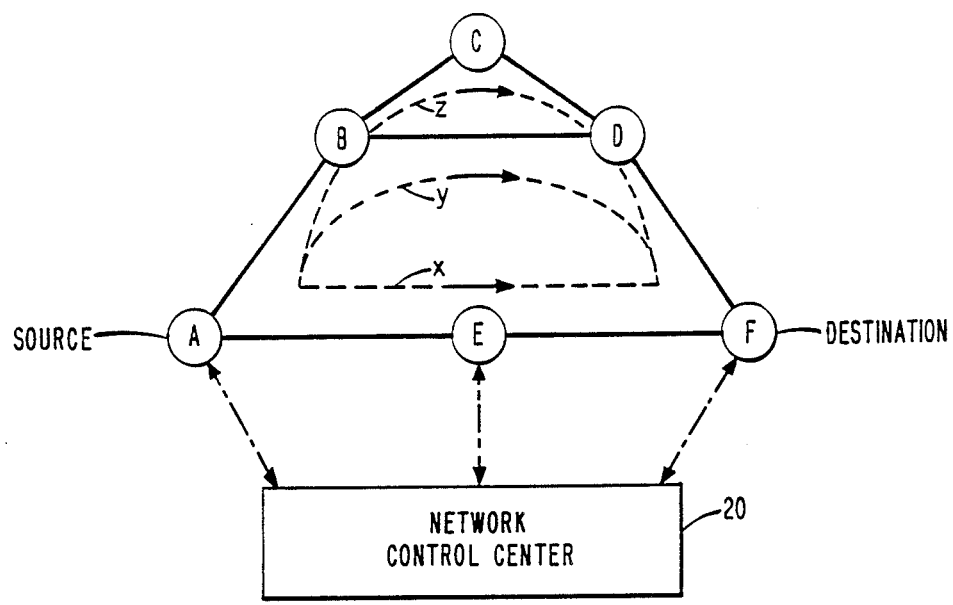
FIG. 3 is an example of how the system of the present invention uses control variables to allocate future traffic along defined routes using today's network control structure.

FIG. 3 illustrates a realization of the above process using today s network control structure.

Referring to FIG. 3 three a priori defined routes x, y and z are shown between source A and destination F. Route x consists of links AE and EF. Route y consists of links AB. BD and DF. Route z consists of links AB. BC, CD and DF. PARS sets the control variables for each link in each route as well as for each route. If routes x, y and z are to carry 50% (0.5), 25% (0.25), and 25% (0.25) respectively of the traffic between AF, then for the 50% of the traffic passing through switch B. the control variables and therefore the routing table for links BC and BD are set to 0.5 since each of these links is assigned 50% of the traffic through switch B.

To control a dynamical system in real-time, one typically models the physical system through a set of differential equations of the form $$\frac{d}{dt} s(t) = f(s(t), u(t)),$$

where s and u represent the state of the system and the control input, respectively. The control u is then chosen to optimize a pre-defined performance objective (which is a function of the system state and the control input). In a stochastic system, one attempts to optimize the expected performance with the choice of control.

With this prelude, consider a single TG. We define the state of the system (TG) as the number of busy circuits on the TG at any given time and denote this random variable by x(t). Furthermore, we denote $A[t,t+\delta)$ and $D[t,t+\delta)$, respectively, to be the number of arrivals to and the number of departures from the system during a small time interval $[t,t+\delta)$, with A and D having probability distributions defined with respect to x(t), t, and $\delta$. We now define an estimator of x as $$\hat{x}T(t + \delta) = E\{x(t + \delta)|x(O) = z(O);$$

$$A[O, \delta) = a(\delta), A[\delta, 2\delta), = a(2\delta), \ldots,$$

$$A[t - \delta, t) = a(t), t_a;$$

$$D[O, \delta) = d(\delta), D[\delta, 2\delta) = d(2\delta), \ldots, D[t - \delta, t) = d(t), t_d\}$$

where z, a, and d represent realizations of the random variables x, A, and D, respectively, with $t_a$ and $t_d$ denoting the time of the last arrival and departure and E denotes the expectation operator. Assuming a Markovian system, we have $$(t+\delta)=E\{x(t+\delta)|x(t)=z(t)\}. \quad (1)$$

To predict the number of busy circuits on the TG, we first make the following assumptions:

$$E\{A[t,t+\delta)\}=\lambda\delta \text{ and } E\{D[t,t+\delta)\}=\mu\delta z(t);$$

that is, during a small time interval $\delta$ (or smaller), we assume that calls arrive at a rate $\lambda$ and that each call departs at a uniform rate of $\mu$. Therefore, we may write equation (1) as $$\hat{x}(t+\delta)=(1.\mu\delta)z(t)+\lambda\delta. \quad (2)$$

We now determine the relation between and its L derivative. Since z(t) is (t)(i.e., z(t) is an estimate of x(t) with zero variance) limiting $\delta$ to zero yields the following differential equation for the TG occupancy estimate:

$$\frac{d}{d\tau} \hat{x}(\tau) = -\mu\hat{x}(\tau) + \lambda \quad \hat{x}(\tau_0) = z(\tau_0).$$

The control variable u is added to the above equation in the following manner:

$$\frac{d}{d\tau} \hat{x}(\tau) = -\mu\hat{x}(\tau) + \lambda u \quad \hat{x}(\tau_0) = z(\tau_0), \quad (3)$$

for external arrivals to the TG is the variable under control. Finally, the TG occupancy, predicted $\Delta t$ time units ahead is given by the solution to (3): i.e..

$$\hat{x}(\tau_0 + \Delta t) = e^{-\mu\Delta t}z(\tau_0) + \frac{\lambda(\tau_0)u}{\mu}(1 - e^{-\mu\Delta t}), \quad (4)$$

where $\lambda(\tau_0)$ and u are assumed constant during the prediction horizon $[\tau_0, \tau_0+\Delta t]$ (we will show how to obtain an estimate of $\lambda$, shortly). Not surprisingly, the prediction in (4) also represents the average TG occupancy of an M/M/$\infty$ (Poisson arrivals/exponential holding times/unlimited capacity) system, since similar assumptions are made in both derivations.

Figure 4:
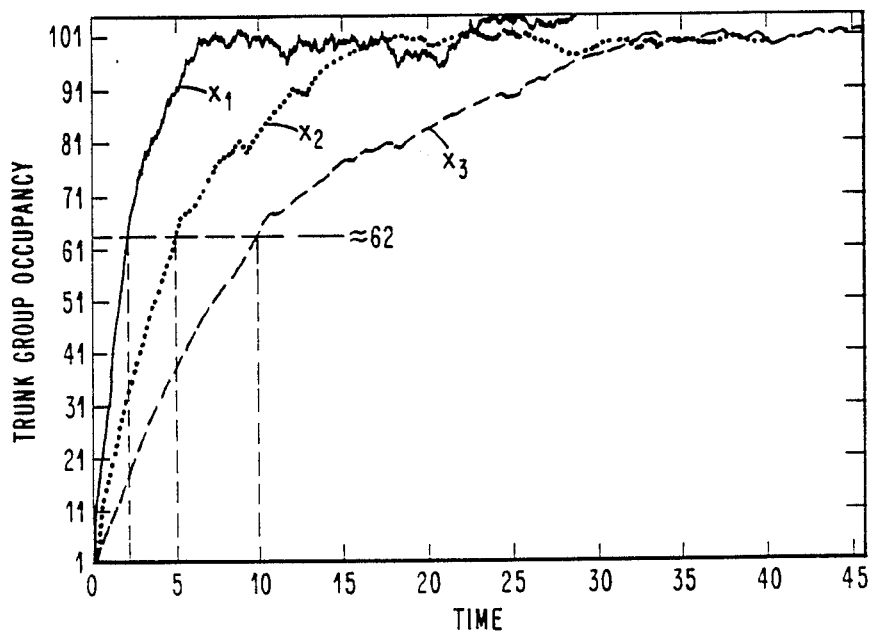
FIG. 4 is a plot of average occupancy level of a trunk group vs. time for three different average holding times.

Plotted on FIG. 4 are three simulated M/M/$\infty$ systems with average holding times of 2($\times$1), 5($\times$2), and 10($\times$3) minutes respectively; the arrival rates are adjusted so that all three systems have the same steady-state value for the mean occupancy level. Note that in one time constant equal to the average holding time, the mean occupancy level of each system has reached approximately 62 percent of the final value (as is the case for a first-order system).

The extension of the differential equation model to a multi-class traffic environment is straight forward. Let the random variables p and q represent the number of calls in progress in the system due to different traffic classes P and Q, respectively. Then the estimate of the TG occupancy level $$\hat{x}(\tau) = (b_p \; b_q) \begin{pmatrix} \hat{p}(\tau) \\ \hat{q}(\tau) \end{pmatrix},$$

where $b_p$ and $b_q$ denote the number of trunks necessary to accommodate a single call of each class (the number is determined by the bit rate of each call class), and and are solutions to the following differential equation:

$$\frac{d}{d\tau}\begin{pmatrix} \hat{p}(\tau) \\ \hat{q}(\tau) \end{pmatrix} = \begin{pmatrix} -\mu_p & 0 \\ 0 & -\mu_q \end{pmatrix}\begin{pmatrix} \hat{p}(\tau) \\ \hat{q}(\tau) \end{pmatrix} + \begin{pmatrix} \lambda_p & 0 \\ 0 & \lambda_q \end{pmatrix}\begin{pmatrix} u_p \\ u_q \end{pmatrix},$$

with parameters of each call class being identified by the subscripts p and q, respectively.

However, from this point on we shall limit our on to a single class of traffic.

Given the physical and the routing topologies of the network, we formulate the predicted load levels for all network TGs (assuming unlimited capacity) as a function of routing and access-control as follows:

$$\hat{x}_i(t + \Delta t) = e^{-\mu\Delta t}z_i(t) + \quad (5)$$

$$(1 - e^{-\mu\Delta t})/\mu \sum_{sd \in S} \left\{ \lambda_{sd}(t) \sum_{k=1}^{r_{sd}} u_{sd}^k(t) (\delta_{sd}^k)_i \right\}$$

S={Enumerated set of network SD pairs}|S|=N, where $z_i(t)$ is the number of busy circuits on $TG_i$ at time t; $_i(t+\Delta t)$ is the predicted number of busy circuits on $TG_i$; N is the total number of SD pairs in the network; $\lambda_{sd}(t)$ is the arrival arrival rate for the SD pair sd during the following $\Delta t$ minutes; $r_{sd}$ is the number of routes assigned to the pair sd; $u_{sd}k(t)$, the $k^{th}$ control variable of the SD pair sd, represents the proportion of the incoming sd traffic flow to be assigned to sd's $k^{th}$ route, during the upcoming control interval; and $(\delta_{sd}k)i$ the indicator function (i.e.. it assumes a value of 1 if the $k^{th}$ route of SD pair sd passes through $TG_i$, and O, otherwise).

The average holding time in equation 5 is measured in real-time and is assumed to remain constant during a time interval that is much longer than the prediction horizon (for example, if the prediction horizon is of the order of minutes, then we assume that the average holding time remains constant during a half or one hour period.) Consequently, at time t, the only unknown variables in equation 5 are time varying SD arrival rates. We propose to measure, and form an estimate of, each SD pair's arrival rate every T minutes.

Before developing the process for estimating SD arrival rates, we elucidate the relation between T and $\Delta t$. Thus far, we have assumed that $\Delta t$ represents both the prediction horizon and the control updating interval. In fact, this need not be so. Let $\Delta t$ and T represent the prediction horizon and the measurement (and control) interval, respectively. The interval T must be chosen small enough to capture and control the transients of network TGs generated by surges in the offered traffic before they result in congestion in network components (see FIG. 7). Since the time constant of a TG's mean occupancy is determined by the average holding time (equation 4) T should be less than or equal to the average holding time. However, for the computed control to be predictive, the prediction horizon t may be chosen longer than the updating interval T. For example, if the average holding time in the network is determined to be 5 minutes, then $\Delta t$ may be set to 10 minutes while T is set to 5 minutes.

We propose to track a time-varying arrival rate with the aid of the following difference equation model:

$$\begin{pmatrix} \lambda(t+T) \\ \frac{d}{dt}\lambda(t+T) \end{pmatrix} = \begin{pmatrix} 1 & T \\ 0 & 1 \end{pmatrix} \begin{pmatrix} \lambda(t) \\ \frac{d}{dt}\lambda(t) \end{pmatrix} + W(t) \quad (6)$$

where $$W(t) = \begin{pmatrix} w_1(t) \\ w_2(t) \end{pmatrix}.$$

The noise processes $w_1$ and $w_2$ (commonly referred to as state noise), which capture the uncertainty in the model are assumed to be white Gaussian with zero mean. Let $$y(t) = (1\ 0) \begin{pmatrix} \lambda(t) \\ \frac{d}{dt}\lambda(t) \end{pmatrix} + v(t),$$

where y(t) denotes the measured arrival rate (the S-D subscripts are omitted for convenience). The measurement noise v(t) is also assumed to be a white, zero-mean process. Furthermore, the state and measurement noise variances are assumed to be $$E\{W(t)W(t)^T\} = Q = \begin{pmatrix} q_{11} & 0 \\ 0 & q_{22} \end{pmatrix} \text{ and } E\{v(t)^2\} = \sigma^2.$$

The choice of the second-order model is motivated by the necessity to capture significant shifts in the pattern of arrival rates in a timely fashion, using a "simple" procedure (more complex linear models do not lend themselves to real-time applications). Note that, with appropriate choices for T, Q, and $\delta$, the proposed model can track ramp/step/parabolic profiles.

Using this model we can form an unbiased estimate $\hat{\lambda}(t)$ of the true arrival rate $\lambda(t)$. The solution to this problem is well known and is given by $$\hat{\lambda}(t,t) = [1 - \alpha(t)]\hat{\lambda}(t,t-T) + \alpha(t)y(t)$$

$$\hat{\lambda}(t,t) = [1 - \alpha(t)]\hat{\lambda}(t,t-T) + \alpha(t)y(t)\frac{d}{dt}\hat{\lambda}(t,t) = \quad (7)$$

$$[1 - \beta(t)]\frac{d}{dt}\hat{\lambda}(t,t-T) + \beta(t)\frac{[y(t) - \hat{\lambda}(t-T,t-T)]}{T}$$

where $\hat{\lambda}(t,t)$ represents the filtered estimates of $\lambda(t)$ using y(t); and $\hat{\lambda}(t,t-T)$ represents the predicted estimate of $\lambda(t)$ derived by propagating $\hat{\lambda}(t-T,t-T)$ through the difference equation 6, $$\hat{\lambda}(t,t-T) = \hat{\lambda}(t-T,t-T) + T\frac{d}{dt}\hat{\lambda}(t-T,t-T).$$

The parameters $\alpha(t)$ and $\beta(t)$ are the so called Kalman Gains and are computed recursively using the well known Kalman Gain equations.

To quantify the measurement noise in the Kalman Filter equations we assume that the traffic arrival process is Poisson. The measured arrival rate y at time t is defined as the number of arrivals N measured during the preceding interval of duration T, divided by T. (Thus the mean and the variance of N is $\lambda(t)$ for a known $\lambda$.) We define the measurement noise as the deviations between the measured and the true arrival rate $\lambda(t)$; i.e., $$E\{v^2\} = E\left\{\frac{N}{T} - \lambda(t)\right\}^2$$

$$= \frac{\lambda(t)}{T} \approx \frac{\hat{\lambda}(t,t)}{T},$$

that is, we may approximate the measurement noise using the current estimate of the arrival rate. We further assume that $q_{11} << q_{22}$; i.e., most of the uncertainty in the dynamical model lies in the assumption of constant velocity (since we intend to capture sudden changes in profile in a timely fashion). To attain robust filter performance and to minimize the computational complexity of the overall algorithm, we advocate the use of time-invariant, sub-optimal Kalman Gains which are derived by averaging the resulting optimal steady-state gains of a number of simulation studies. For example, as a result of our studies, for an update interval of two minutes (T=2). 0.7 and 0.4 were chosen for the Kalman Gains $\alpha$ and $\beta$, respectively.

Figure 5A:
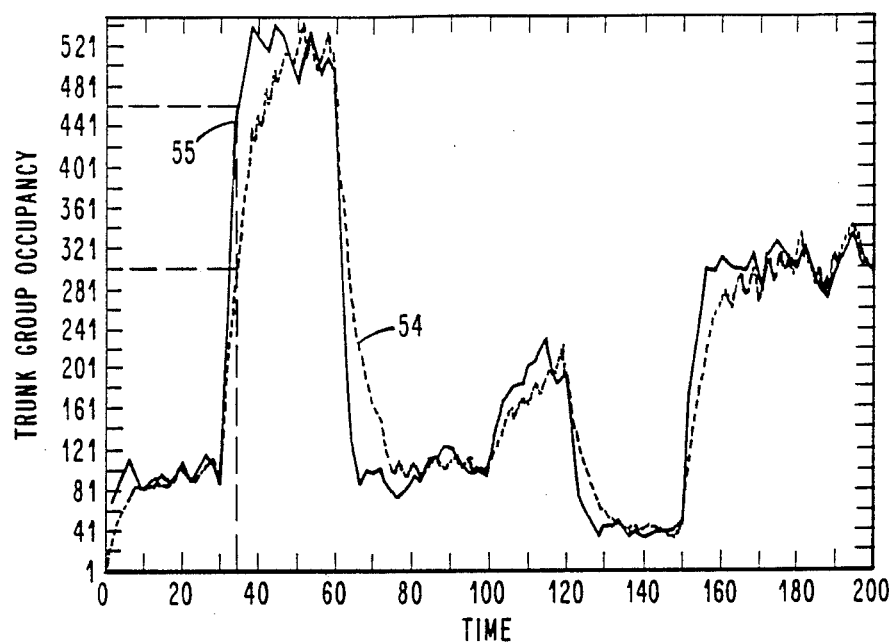
FIG. 5a is a plot of actual vs. predicted trunk group occupancy for a single trunk group using the system of the present invention.
Figure 5B:
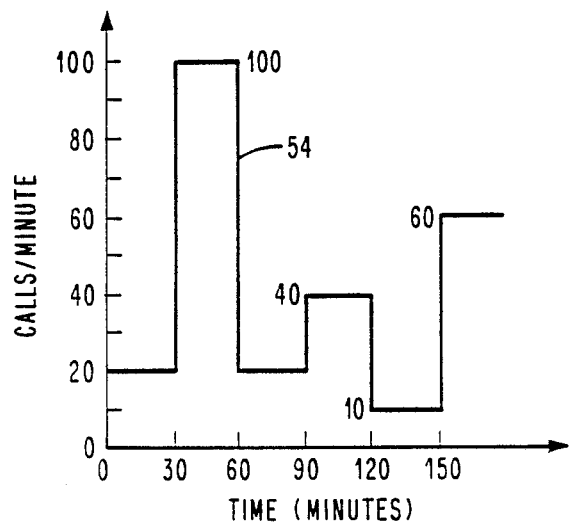

Having performed estimates of the arrival rates for each SD pair, the second task in PARS is to predict the future occupancy levels of all TGs in the network using the state predictor equation 5, as a function of routing and access-control. Plotted in FIG. 5a is the occupancy of a single TG, as a function of time, for uncontrolled traffic (u=1) having an average holding time of five minutes (dotted line) 54. The actual arrival rate profile is plotted in FIG. 5b. Overlaid on FIG. 5a (solid line) is the predicted value of the TG occupancy 55 using a sampling interval of 2 minutes for the arrival rate estimation (T=2). and a prediction horizon of 10 minutes ($\Delta t=10$). For example, in FIG. 5a, thirty-four minutes into the process, the actual TG occupancy is approximately 300 while equation 5 predicts a value of 460 for the thirty-four minute mark.

Having formed TG occupancy level projections as a function of control, the final task in PARS is to compute the "optimal" traffic control policy for the duration of the projection interval.

It follows from the previous section that the projected number $B_{sd}$ of blocked calls for a given SD pair sd during a projection horizon of length $\Delta t$ is $$B_{sd} = \hat{\lambda}sd\Delta t \left(1 - \sum_{k=1}^{r_{sd}} u_{sd}^k(t)\right).$$

(To simplify notation without loss of generality we let $T=\Delta t$ for the remainder of the disclosure.) We define the blocking vector B as one whose components are comprised of the projected blocking of all SD pairs in the network. The control objective is then stated as follows:

Minimize $\sum_{sd\epsilon S} B_{sd}$ Subject to (8)

$0 \leq x_i(t + \Delta t) \leq cap_i$ with $i = 1, 2, \ldots, TG_{max}$ and $\sum_{k=1}^{r_{sd}} u_{sd}^k(t) \leq 1$, and $u_{sd}^k \geq 0$, where $cap_i$ denotes the capacity of the i'th TG and $TG_{max}$ represents the total number of TGs in the network. The above constraints form a set of linear state-dependent control constraints: the upper and lower bounds on the link capacity can be rewritten, using the state estimator 5, as $$\sum_{sd\epsilon S}\left(\hat{\lambda}_{sd}(t)(1 - e^{-\mu\Delta t})/\mu \sum_{k=1}^{r_{sd}} u_{sd}^k(t)(\delta_{sd}^k)_i\right) \leq cap_i - e^{-\mu\Delta t}z_i(t) \quad (9)$$

and $$\sum_{sd\epsilon S}\left(\hat{\lambda}_{sd}(t)(1 - e^{-\mu\Delta t})/\mu \sum_{k=1}^{r_{sd}} u_{sd}^k(t)(\delta_{sd}^k)_i\right) \geq e^{-\mu\Delta t}z_i(t)$$

respectively. Consequently, we may express, concisely, the control constraints in vector notation as $A(\hat{\lambda}_{sd})u \leq c(z_i),$ where the vector u represents the collection of the traffic control variables appropriately scaled by matrix A, and the vector c represents the ensemble of constraint parameters.

Note that, the state-dependent constraints in (9) relate more closely to network blocking when $cap_i$ is large. We base this claim on the fact that, since both steady-state mean and variance of an M/M/$\infty$ system are equal to $\lambda/\mu$[13], the ratio of standard deviation to mean tends to zero as the mean tends to infinity. The upshot of this argument is that for large capacity TGs, as the steady-state occupancy level gets closer to the capacity limits, the fluctuations about the steady-state mean become less significant. This observation, combined with the fact that a fiber TG is expected to accommodate thousands of calls (employed in "efficient" networks of the future), justifies the implicit assumptions regarding blocking in (9).

Figure 6:
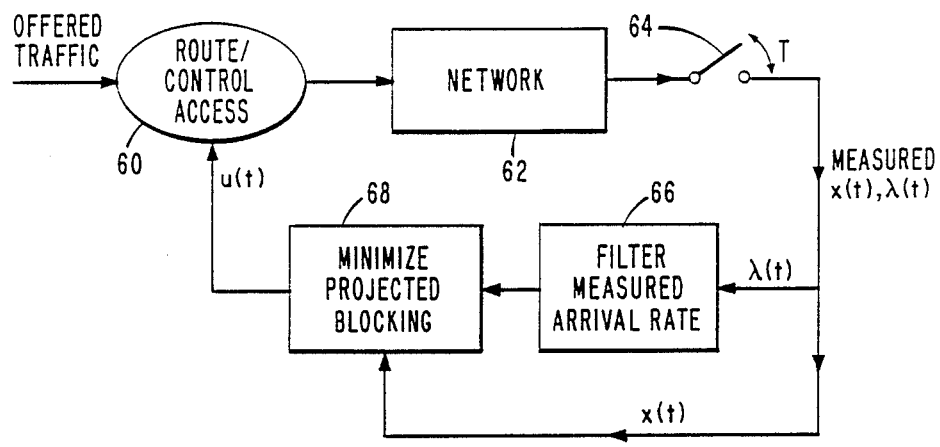
FIG. 6 is a block diagram of the control procedure of the present invention.

FIG. 6 illustrates the PARS control procedure in block diagram form. In FIG. 6, the offered traffic is presented to a switch 60 which both controls access to the network 62 and routes traffic through the network 62 using previously determined traffic control variables. At the end of time interval 64, an instantaneous state of the network is forwarded to the control center with a measure of the rate of arrivals for time interval t, $\lambda(t)$ and a measure of link occupancies x(t) for each trunk group. The measured arrival rate $\lambda(t)$ is filtered 66 to obtain a predicted rate for the next time interval, and then used with the measured trunk group occupancy x(t) in the optimization routine to minimize blocking 68 for the next time interval, resulting in a new traffic control variable u(t) which is entered into switch 60 as a control variable for the succeeding time interval.

Figure 7:
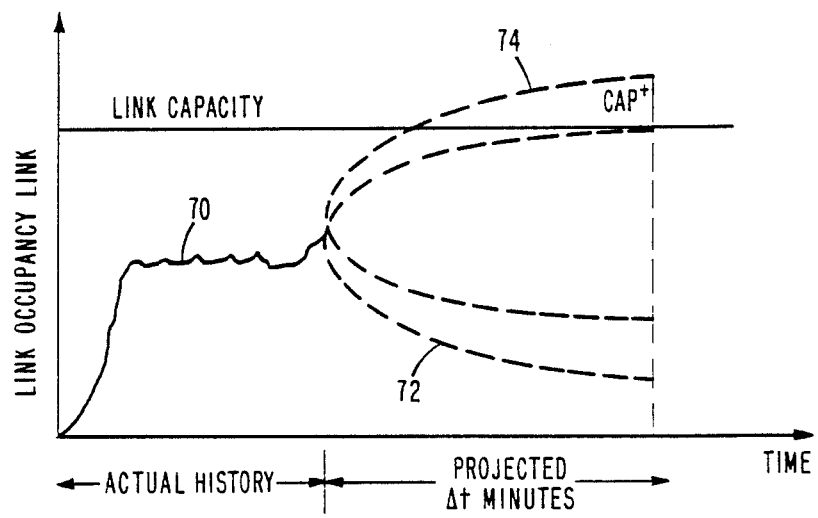
FIG. 7 is a plot of a few projected link occupancy level trajectories as a function of the routing and access control of the present invention.

FIG. 7 illustrates the control concept by depicting a TG controlled by PARS. The solid line 70 of the graph in FIG. 7 represents the actual history of the TG occupancy level. The dotted lines 72, 74 depict a few projected state trajectories of the TG as a function of the control policy u. In this figure, for example, it is predicted that one control policy, if adopted, would yield a trajectory 74 which, $\Delta t$ minutes into the future, would violate the TG capacity constraint by an amount cap+: i.e., cap+ customers would have to be blocked. In this fictitious scenario a desirable control policy would be to distribute the projected overflow cap+ amongst other routes which do not intersect this TG. If the extra load cannot be distributed, cap+ customers would have to be blocked at the source, since attempts at routing the extra demand will result in the waste of precious network resources during congestion periods. However, when this situation is predicted for multiple SD pairs, deciding which SD demands to block is not a trivial matter.

As we have stated previously, the control objective is to minimize the norm of B subject to certain network constraints. If the objective is to maximize the number of served customers during an upcoming interval of length $\Delta t$, then Norm 1, i.e., a linear program, accurately models this objective. However, formulating the problem in this manner may ignore a fundamental concern in telecommunication networks that is illustrated by the following example.

Consider the simple 3-node network in FIG. 8. Each link in this network has a capacity of $\lambda$(actually $\lambda/\mu$ with $\mu$ and $\Delta t$ normalized to 1) and the network accommodates two SD pairs AC and BC with equal demands (2$\lambda$). The linear program formulation of this problem is Minimize $B_{AC}+B_{BC}$ Subject to Capacity Constraints (10) and the non-negativity constraints. Clearly, the optimal call-carrying capacity of the network is 2$\lambda$. Consequently, any solution which lies on the line $B_{AC}+B_{BC}=2$ of FIG. 9 is an optimal one, including $B_{AC}=0$ with $B_{BC}=2$ and $B_{AC}=2$ with $B_{BC}=0$.

Although the above solutions are optimal in the sense of equation 10, for many telecommunication applications they would be considered unfair. The problem cannot be remedied by the addition of extra constraints (such as minimize subject to $B_{BC} \leq$ Threshold or viceversa) since we may sacrifice optimality or cause the constraints to become infeasible. The problem illustrated by the above example is not uncommon. In fact, the problem of non-unique minima occurs in contention situations where one call rejected from a SD pair is equivalent to one call gained by another SD pair in the network.

To avoid "unfair" solutions while preserving the original performance objective (blocking), we reformulate the problem during contention periods, as a quadratic programming problem Norm 2:

$$\text{Minimize} \sum_{sd \in S} \frac{B_{sd}^2}{\lambda_{sd}} \quad (11)$$

subject to the capacity and positivity constraints, with $t=1$ for simplicity. The solution to the minimization in equation 11 has a number of desirable characteristics. The first, is that the objective in equation 11 captures the "fairness" quality by minimizing a weighted variance of the fraction of SD blocked calls. The choice of $\lambda_{sd}$ for weights can be motivated by the solution to the following special problem. Consider a number of SD pairs competing for network resources. Furthermore, assume that we can state the minimization problem in terms of SD blockings, as we did for the 3-node problem in FIGS. 8 and 9 i.e., $$\text{Minimize} \sum_{sd \in S} \frac{B_{sd}^2}{\lambda_{sd}} \text{ Subject to } \sum_{sd \in S} B_{sd} \geq -K + \sum_{sd \in S} \hat{\lambda}_{sd}$$

where K denotes the optimal call-carrying capacity of the network (K=2 in the 3-node example). Therefore, the capacity constraints merely state that the minimum achievable number of blocked calls is given by the difference between the input demand and the optimal call-carrying capacity of the network. In this setting, the number of blocked calls of each competing SD pair is directly proportional to its demand:

$$B_{sd} = \frac{\hat{\lambda}_{sd}\left(-K + \sum_{sd \in S} \hat{\lambda}_{sd}\right)}{\sum_{sd \in S} \hat{\lambda}_{sd}}, \quad (12)$$

as the minimum of equation 11 is located at the point of first intersection of the expanding ellipsoids (surfaces of equal cost) with the hyperplane that is defined by the constraint on the number of blocked calls, shown in FIG. 9. As an example, the quadratic objective function, when applied to the 3-node problem described above, has for solution $$B_{AC} = \frac{\hat{\lambda}_{AC}}{2} \text{ with } B_{BC} = \frac{\hat{\lambda}_{BC}}{2}.$$

Solutions resulting from the linear program formulation in equation 8 and the quadratic program formulation in equation 11, when applied to a more complicated 3-node example, are summarized in Table I.

TABLE I

| 3-Node fully connected Network; Each TG capacity = 15 6 SD Pairs; 2 Routes Per Pair | | | |
|---|---|---|---|
| | | Sum of the Routing Variables | |
| SD | | LP | QP |
| AB | 15 | 1.0 | 0.75 |
| AC | 5 | 0.0 | 0.75 |
| BA | 15 | 1.0 | 0.75 |
| BC | 5 | 0.0 | 0.75 |
| CA | 15 | 1.0 | 0.75 |
| CB | 5 | 0.0 | 0.75 |

Again, without loss of generality, the service rate $\mu$ is set to unity in this example. Note that, both algorithms achieve the same cost in this example: however, the solution to the quadratic program implements the access-control policy is a more "even" manner.

The second desirable quality of the quadratic programming formulation is that the value of the objective function is indirectly tied to the number of blocked calls. For example, if there is a way to fully accommodate the incoming traffic by altering SD route choices, the quadratic program will do so, as equation 11 possesses the same minimum as in equation 8. In cases where access-control becomes necessary, the SD pairs with higher demand are favored over those with lower demand, however, the quadratic program's solution may not match that of the linear program.

The invention uses the following strategy for obtaining the control variables. We first solve for the linear programming problem in equation 8. If the solution does not call for access-control, i.e., the control variables of each SD pair sum to 1, we are done. If access-control is recommended on any of the SD pairs, we solve the quadratic programming problem in equation 11. We then compare the resulting cost functions of the linear and quadratic program. The linear program solution is implemented when its resulting cost function is lower than the quadratic program's, as this signifies that the solution to the problem is unique. The quadratic program solution is implemented when the two objective functions are equal, as the linear program solution may be "unfair".

Figure 10:
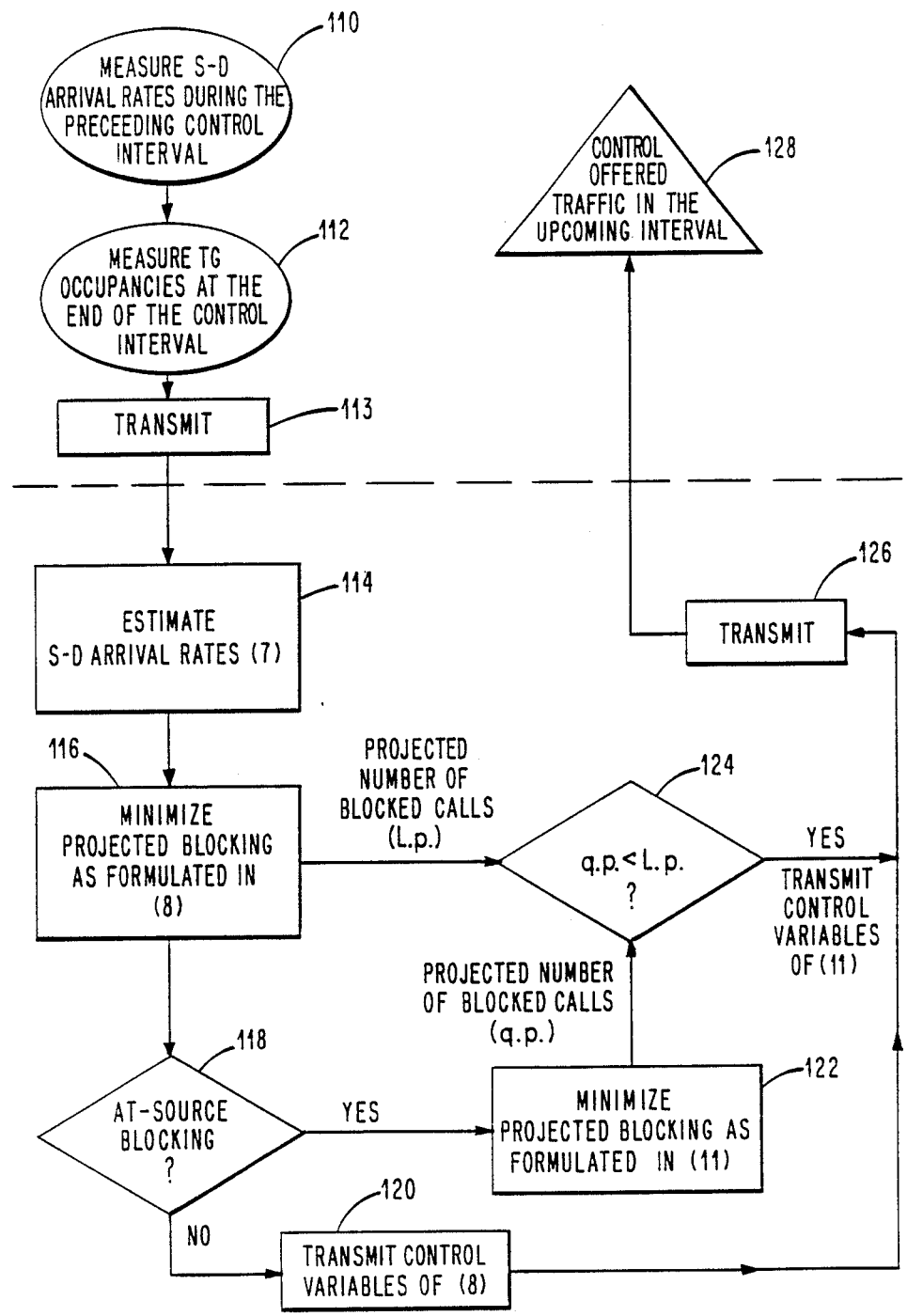
FIG. 10 is a flow chart of the control algorithm used in the present invention.

The PARS control algorithm may be summarized (see FIG. 10) as follows:

A. At the network elements (NEs)
  (i) during the interval (t,t−T), each SD pairs' arrival rate is measured 110;
  (ii) at time t, the number of busy circuits on each TG in the network are measured 112;
  (iii) at time t, the measurements are relayed to the NCC 113;
  (iv) at the network control center (NCC) the PARS system;
    (a) forms an estimate of each SD arrival rate using equation 7, 114;
    (b) solves the linear program in formulated in equation 8, 116;
    (c) checks the sum of the traffic control variables for each SD pair 118;
    (d) initiates step vi) when they all sum to 1, 120; else
    (e) solves the quadratic program in equation 11, 122;
    (f) sets the control vector u(t) equal to the linear program solution when the linear program objective is less than the quadratic program objective; else u(t) is set equal to the quadratic program solution 124;

(v) the control variables are transmitted to the appropriate switches in the network 126;

(vi) during (t+T,t], the switches control incoming traffic accordingly 128.

We now illustrate the traffic control attributes of PARS through a series of simulated examples. In all of the examples the interdeparture and the interarrival times were exponentially distributed. In some of these examples we compare PARS's performance to an alternative dynamic routing strategy which we shall refer to as Algorithm-I. (A-I). A-I's routing strategy forms the basis for some of the existing dynamic traffic algorithms. A-I, as in PARS, assumes a pre-defined routing topology. A-I splits SD pair demands in proportion to the idle capacity on each route connecting the nodes; the idle capacity on a route is defined as the minimum of the excess capacities of the links comprising the route.

The first example involves a simple 4-node network with two SD pairs AD and BD. Each pair has two routes assigned to it, for which $u_1$, $u_2$ and $u_3$, $u_4$ are the control variables respectively. The complete simulation scenario is depicted in FIGS. 11a and 11b. During the time interval [0.30) SD arrival rates are set at 20 call/minutes. During the interval [30.60) the AD arrival rate is changed to 100 while BD's demand is kept constant. In this simple scenario, there is only one way in which the extra load may be accommodated; the SD pair BD must route all its traffic via links $x_3$, $x_4$, thereby allowing the SD pair AD full use of what is perceived to BD's direct route, link X5. Since the sampling interval is 2 minutes, the first sign of change is sensed at the 32 minute epoch. The traffic control variables for each SD pair are plotted on FIGS. 12a and 12b.

Figure 12A:
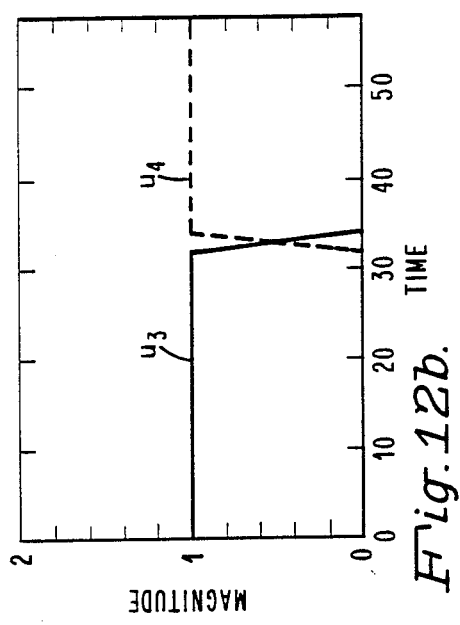
FIGS. 12a and 12b plot the traffic control variables for the example of FIGS. 11a and 11b.
Figure 12B:
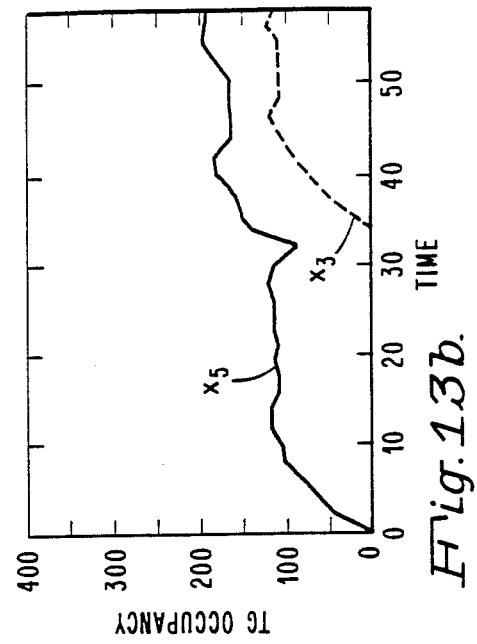
Figure 13A:
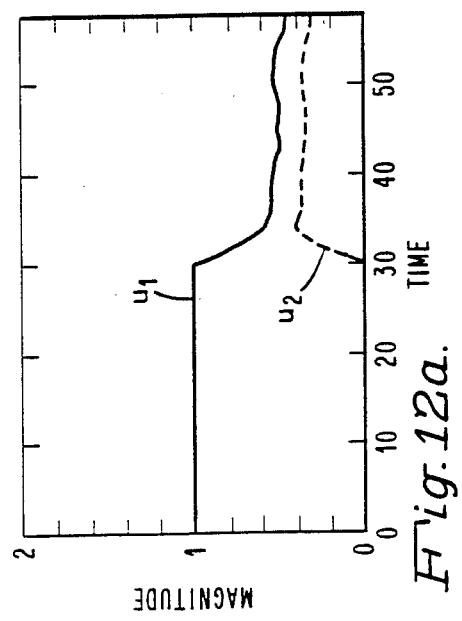
FIGS. 13a and 13b show the trunk occupancies for the example of FIGS. 11a and 11b.
Figure 13B:
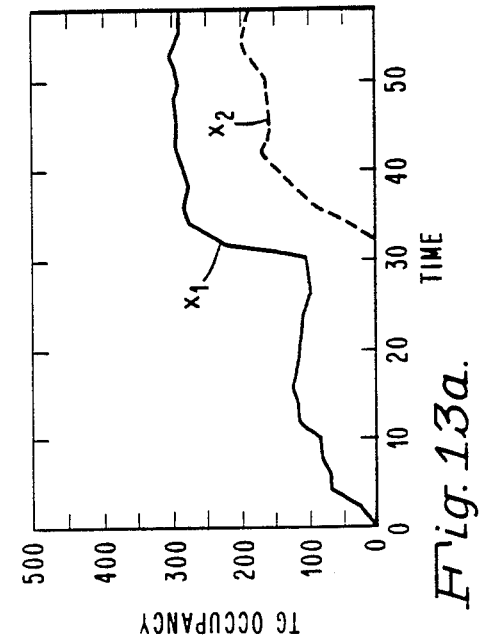

At the 32 minute mark the jump in the arrival rate is captured, but the smoothing effect of the past estimate prevents a complete control reaction. The AD control variables $u_1$, $u_2$ are adjusted slightly as shown in FIG. 12a, but BD's control variables $u_3$, $u_4$ remain unaltered, as shown in FIG. 12b. At the next sampling epoch (i.e., t=34). the measured arrival rate confirms the previous one and PARS generates a complete response to the overload (see FIGS. 12a and 12b). The predictive nature of the decisions is demonstrated in FIGS. 13a and 13b as the TG occupancy trajectories are altered before the capacity limits are reached.

In the second and third examples, we compare the performance of PARS to that of (A-I). A 5-node network is chosen for this purpose. The scenario for the second example is depicted in FIGS. 14 and 15. Ten links from AB to DE are shown, all having a capacity of 12 calls. The arrival rate for all SD pairs, except AC and EC is 0.0. λAC and λEC are plotted in FIG. 15. Alternate routes for AC are AE,EC and AB,BC. Alternate routes for EC are ED,DC and EB,BC. The phenomena of interest is displayed by the occupancy profile for link EC for each network control algorithm. The oscillatory load on link EC, when controlled by A-I, may be explained as follows. In the A-I environment each SD pair computes its traffic control variables independently. Consequently, when a TG occupancy level becomes low, all routes crossing the TG are assigned to carry a high proportion of the incoming SD traffic. At the following updating epoch the TG becomes congested and the SD pairs avoid using those routes until the next updating period (when the TG has emptied out), and so on.

In FIG. 16, A-I initially recommends that both source nodes A and E should split the traffic destined for C, evenly between their routes (since the TGs are initially empty). Since the average holding time is taken to be five minutes, an updating interval of ten minutes allows the TG occupancy levels to reach approximately eighty-six percent of their steady-state value, according to equation 4. Consequently, TGs BC and EC become congested and decongested in a cyclic manner (see FIG. 16).

Even when the arrival rates change from high to low, in the case of SD pair AC, and low to high, in the case of the pair EC, the cyclic phenomena continues, because the effect on the network links is the same as before. In contrast to A-I, PARS utilizes the network resources maximally to accommodate the demand throughout the simulation, as shown in FIG. 17; the capacity of link EC is used continuously to accommodate a third of the AC traffic during [0.45) time period; an analogous procedure is repeated for the SD pair EC during [45,100) period.

In this example, we can eliminate the oscillations for A-I by decreasing the update interval. However, this approach does not solve the problem in general, as we can regenerate the oscillatory behavior by increasing the number of SD pairs that contend for links EC and BC. In fact, the problem here is that in A-I each SD pair chooses network resources according to its perceived (not necessarily correct, as in this case) payoffs.

Figure 18:
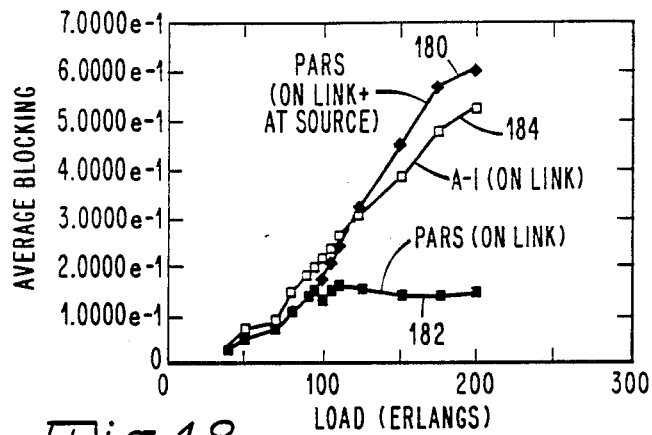
FIG. 18 compares the average blockings of the present invention vs. the prior art for the example of FIGS. 14–17.

Plotted on FIG. 18 is the average blocking achieved by each control algorithm for the 5-node network of FIG. 14. The assumptions on which this plot is based are as follows:

| SD | Proportion of Contribution to the Load | Avg. holding time = 5 min. Capacity of all links = 15 Sampling Interval = 10 min. |
|---|---|---|
| AB | ⅓ | |
| AC | 1/12 | |
| EB | 1/12 | |
| EC | ⅓ | |
| ED | 1/12 | |
| DA | 1/12 | |
| DB | 1/12 | |
| DC | 1/12 | |

(A-I, unlike PARS, does not penalize traffic carried on longer routes; consequently, to do a fair comparison, we restrict the routing topology to one or two link routes.) For light traffic conditions (0–50 erlangs) there is little difference in the achieved average blocking for the two control schemes. For moderate load levels (50–110 erlangs) PARS consistently achieves a lower value of blocking than A-I. One reason for A-I's higher average blocking is that the route comprised of links EB-BC (FIG. 14) for the SD pair EC intersects two routes of the SD pair AB, AC-CB and AE-EB. Since the routing decisions in A-I are made in a decentralized fashion, the SD pair EC has the same "right" to the links EB and BC as the SD pair AB, regardless of the consequence to average blocking.

In the severe overload region (110–200 erlangs) the average blocking achieved by A-I is actually less than the average blocking achieved by PARS. However, recall that the blocking in PARS has two components: blocking on the TG and blocking at the source. Beyond 110 erlangs, an increasingly greater proportion of the incoming traffic is blocked at the source; that is, no attempt is made to hunt for a free circuit, even though there is the remote possibility of locating one. Clearly, A-I must rely on an auxiliary congestion control scheme (for example, intervention by network managers) to prevent the congestion of network switching systems. Note that, when the network is controlled by PARS, the proportion of calls blocked on the TGs 182 remains at almost a constant level (0.14) beyond 110 erlangs.

Figure 19:
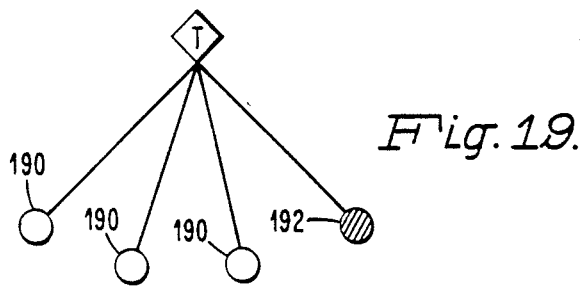
FIG. 19 illustrates a focussed overload situation.
Figure 20:
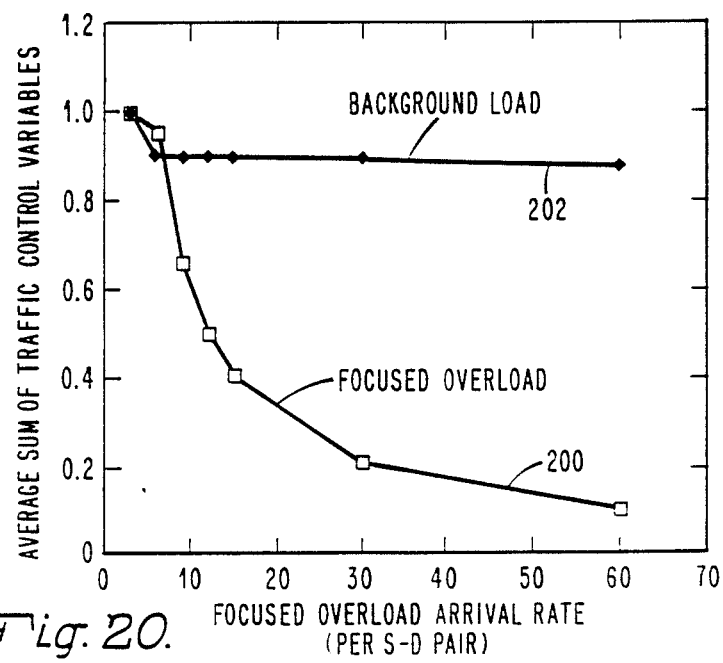
FIG. 20 is a graph showing the effect of focussed overload on the background load using the system of the present invention.

In focused overload situations, a primary concern of network managers is to limit the effect of the focused overload traffic on the background traffic (non-overload) traffic. To illustrate this aspect of PARS's performance, a final test case is simulated. The network is shown in FIG. 19. T is the tandem node. All nodes are fully connected. The focused overload is from clear nodes 190 to the dark node 192. The link capacity is 100 and the average holding time is 5 minutes. FIG. 20 shows the average sum of the traffic control routing variables for the focused overload traffic 200 and the background traffic 202 as a function of focused overload offered traffic with fixed background load (3 call-/minute per SD pair). As the focused overload becomes more severe a higher proportion of the overload traffic is blocked at the source. Furthermore, traffic not destined for the dark node is protected from the effects of the focused overload. Although we have not shown the individual traffic parameters, the blocking is spread evenly between the SD pairs that generate the background and the focused overload traffic, respectively (as a consequence of minimizing the quadratic program).

Since PARS is intended to control the network in real-time, we must solve the optimization problem in real-time. Note that, as we recompute the solution every T minutes, we may use the solution of the preceding interval as the initial guess for the upcoming interval; i.e., we "warm-start" the problem at every sampling interval following the initialization procedure. If the sampling interval is chosen as a function of the traffic profiles in the network (example: for voice calls with an average holding time of 5 minutes the sampling interval should not exceed 10 minutes) the probability is high that the initial guess is both feasible and "close" to the optimal.

Figure 21:
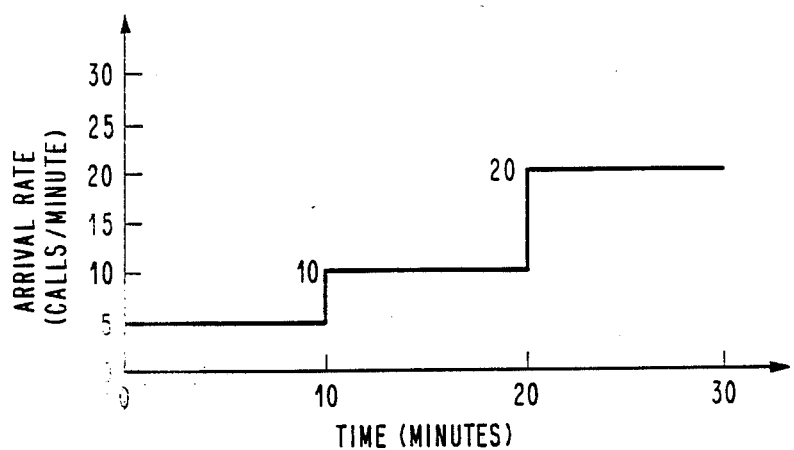
FIGS. 21 and 22 illustrate the time required to recompute traffic control variables in real time as a function of changes in load.
Figure 22:
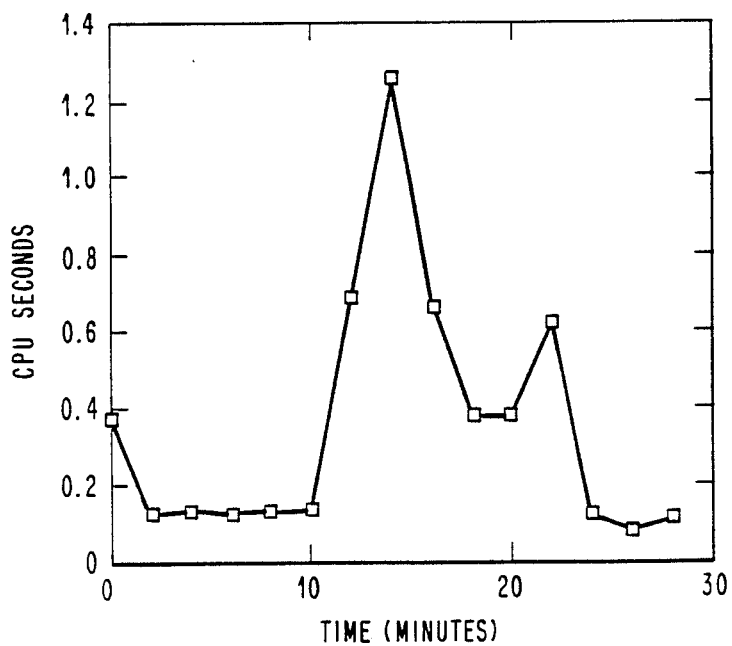

To evaluate the feasibility of computing the traffic control variables in real-time, we have measured the CPU time involved in solving the optimization problems for a number of overload test cases. FIG. 21 shows the arrival rate for each SD pair and FIG. 22 displays the results for one of the "harshest" traffic conditions simulated on a fully-connected six-node network with 30 SD pairs and 90 routes, i.e.. 3 routes pair SD pair. The six-node network was chosen for this test for two reasons. Firstly, the larger GTE Operating Companies use approximately the same number of tandem switches in their local networks. Secondly, the six-node model is similar to an actual network used for field trials by Bell Northern to determine the effectiveness of real-time traffic control schemes.

FIG. 21 displays the load on the network as a function of time for three different operating conditions: for time interval 0,10 the network load is characterized as low to moderate: for 10, 20 as heavy, and 20, 30 as extremely heavy. Computation times (on a VAX 8800) for this scenario are plotted in FIG. 22.

During the first time interval PARS successfully routes all the incoming traffic. Consequently, after initialization, consecutive control updates commence with a feasible, optimal guess. However, at time epoch 12, the initial guess is neither feasible nor optimal, hence the reason for a jump in the computation time. Note that this simulation scenario constitutes an extreme example since the arrival rates are changed for every SD pair in the network. Nevertheless, computation times on the order of one second are not considered prohibitive.

In this disclosure, we have shown that the static, open-loop method of network traffic control may be inappropriate for both the Integrated Service Networks for the future and today's homogeneous but increasingly volatile traffic environments. To deal with this problem, we have developed a predictive access-control and routing strategy (PARS), a dynamic closed-loop network traffic controller.

The control recommendations devised by PARS are a function of the predicted load levels on the network trunk-groups. The predictions are based on real-time network measurements such as source-destination arrival rates and instantaneous trunk-group occupancy levels. PARS manipulates the predicted trunk-group trajectories by a combination of access-control and routing policies designed to optimize the network performance during the prediction horizon. The network service control points (SCPs) actuate the recommendations by a combination of traffic routing and access-control.

We may draw the following conclusions on the performance of PARS from the analysis presented here and the simulation examples.

1. PARS can predict and even prevent network element congestion by a combination of routing and access-control activities.
2. PARS can optimize the real-time network performance by rearranging source-destination route choices on a continuous basis.
3. A certain degree of "fairness" is built into PARS's access-control strategy to avoid unintentional discrimination amongst network source-destination pairs.

Other features and advantages of the invention are apparent when the invention is compared to the prior art. The predictive access-control and routing strategy (PARS) differs from existing real-time network control algorithms in several important ways. PARS optimizes the real-time network performance through a combination of access-control and routing activities. The prior algorithms treat these activities independently. This is an important distinction since different call types differ not only in profile (such as in bandwidth) but they may also generate disparate revenues. Consequently, in order to achieve optimal network performance, some calls may have to be blocked at the expense of others. Furthermore, when the demand on the network surpasses the optimal service-carrying capacity. PARS controls access to network resources in an "unbiased manner" from the point of sources and destinations. That is, a certain degree of "fairness" is built into the access-control element of PARS.

PARS, in a manner that is similar to the prior algorithms presented, pre-defines a number of routes for each Source-Destination (SD) pair. In contrast, however, PARS does not impose a limit on the number of links in a route (both DCR and DNHR only allow the use of two-link routes). Clearly, for many networks, such as tactical ones, restriction to two-link routes is not realistic.

PARS makes real-time control decisions based on the projected network traffic conditions. This is done by projecting network performance as a function of routing and access-control strategies. PARS then picks the control strategy that yields the expected optimal performance during an upcoming time interval. In this way, PARS is able to predict and even prevent congestion in the network, as opposed to simply reacting to it. This is a unique attribute of PARS.

PARS is truly a real-time, state dependent control scheme. PARS's control strategy is based on real-time link occupancy measurements as well as real-time Source-Destination arrival rates.

PARS can control a telecommunication network that accommodates a plurality of circuit-switched services (such as voice/video/data/etc).

PARS projects the long-term (approximately 5 minutes ahead) network behavior, as a function of routing and access-control. PARS then picks the combined routing and access-control strategy that yields optimal performance during the upcoming 5-minute interval.

I claim:

1. A predictive system for controlling access to and for routing traffic through a network comprising nodes wherein each node is adapted to communicate with each of the other nodes, an interconnection of said nodes constituting a network topology, said system comprising:
   a network control center having a central computer;
   a plurality of nodes in said network, each of said nodes being an intelligent, software controlled switch having a routing table;
   each node having outgoing trunk groups connected thereto and being connected via a data link to said computer in said network control center;
   each of said nodes comprising:
   (a) means to measure a current occupancy state of each of said nodes outgoing trunk groups to determine instantaneous node-to-node link occupancies and to transmit said current state of link occupancies to said network control center;
   (b) means to count each of said nodes number of attempts as source node to reach each of said other nodes as a destination node during a time interval to determine source-destination arrival rates for said interval, and to send said source-destination arrival rates to said network control center;
   a routing topology comprising a set of a priori defined routes from each node as a source to every other node as a destination, each route having one or more links between nodes in said network;
   means to predict source-destination arrival rates for a succeeding time interval based on the actual arrival rates during a current time interval;
   means to predict trunk group occupancy on each link of said network at the end of a next succeeding time interval using as inputs said instantaneous link occupancy measurements, said predicted source-destination arrival rates, said network topology, and said routing topology;
   means to calculate traffic control variables for each source-destination pair of nodes wherein said traffic control variables specify a percentage of incoming traffic to be offered to each route of each source-destination pair for the next time interval;
   means to transmit said traffic control variables to said intelligent switches for use during the next time interval; and
   said intelligent switches updating said routing tables and allocating arriving traffic among said source-destination routes according to said traffic control parameters for the next time interval.

2. The system of claim 1 having means to allocate an incoming call to a source-destination route comprising:
   means to divide the interval between the real numbers 0 and 1 into subintervals, wherein a length of each subinterval is equivalent to a magnitude of each traffic control variable of a particular source-destination pair;
   means to generate a random number between 0 and 1 according to uniform distribution; and
   means to locate the subinterval in which said random number falls, said subinterval representing a route, thereby determining the routing and outgoing link for said call.

3. The system of claim 2 wherein:
   said traffic control variables for a source-destination pair total less than 1, thereby blocking a number of outgoing calls such that an exact proportion of blocked calls is determined.

4. The system of claim 1 further comprising:
   means to assign weights to different types of traffic;
   said means to calculate including means to minimize a weighted sum of source-destination blockings.

5. A predictive access control and routing system for real time management of a communication network comprising:
   a set of nodes, each node comprising an intelligent software-controlled switch having outgoing trunks connected thereto and being adapted to communicate with every other node whereby each node can serve as a source or as a destination, each node to node connection constituting a link, said connections forming a network topology;
   a network control center comprising a centralized computer system;
   a data link connecting each node to said control center;
   a routing topology comprising a set of a priori defined routes between any node of said network as a source node and any other of said nodes as a destination node, each route comprising one or more links;
   means to divide an operational time of said network into time intervals, a length of said intervals being a function of holding times of said network traffic;
   each intelligent switch having means to determine an instantaneous link occupancy state of each of said intelligent switches outgoing trunks at a specified time within a present time interval;
   means to report said link occupancies to said control center;
   means to count a number of attempts from each source node to each destination node during said specified time interval;
   means to report said number of source-destination attempts to said control center;
   said control center having means to predict an arrival rate for each source-destination pair for a succeeding time interval based on said rates for a preceding interval;
   said control center having means to predict a link occupancy for each link of said network at a specified time in a next succeeding time interval based on link occupancy measurements of prior time interval; actual and predicted source-destination arrival rates; network topology; and routing topology;

means to establish traffic control variables for each pair of source-destination nodes for the succeeding time interval, wherein said traffic control variables specify an allocation of a percentage of incoming traffic to each route for each source-destination pair, and wherein said traffic control variables need not sum to 1, thereby controlling access to said network;

means to transmit said traffic control variables to said nodes; and means to effect said allocation within said node.

6. The system of claim 5 further comprising:

means to formulate an optimal routing strategy using said predicted source-destination arrival rates and said predicted link occupancies.

7. The system of claim 6 wherein said means to predict a the future arrival rate λ(t) of incoming traffic comprises:

means to execute a second order linear predictor of the form $$\hat{\lambda}(t,t) = [1 - \alpha(t)]\hat{\lambda}(t,t - T) + \alpha(t)y(t)\frac{d}{dt}\hat{\lambda}(t,t) =$$

$$[1 - \beta(t)]\frac{d}{dt}\hat{\lambda}(t,t - T) + \beta(t)\frac{[y(t) - \hat{\lambda}(t - T,t - T)]}{T}$$

where

λ(t) is the filtered estimate of λ(t):

λ(t,t−T) is the predicted estimate of λ(t); and

α and β are a Kalman Gains;

whereby the predictive estimate of the arrival rate for the succeeding time interval is a weighted sum of the estimate for the just completed preceding interval and the measured arrival rate for said immediately preceding interval.

8. The system of claim 6 in which state estimation is performed at the beginning of a time interval and comprises means to predict an occupancy level of each trunk group at the end of said interval.

9. The system according to claim 6 with means to minimize the number of blocked calls on said network comprising:

means to project the number of blocked calls for each source-destination pair according to the equation $$B_{sd} = \hat{\lambda}_{sd}\Delta t \left( 1 - \sum_{k=1}^{r_{sd}} u_{sd}^k(t) \right);$$

means to represent a total projected network blocking in vector form $$A(\hat{\lambda}_{sd})u \leq c(Z_i),$$

where the vector u is a collection of traffic control variables scaled by matrix A and the vector c is a ensemble of constraint parameters;

means to minimize the norm of B; and means to transmit an output of said minimization to send to the intelligent nodes as said traffic control variables.

10. A predictive access-control and routing system for a network comprising a control center and a plurality of interconnected nodes wherein each of said nodes is adapted to communicate with each of the other nodes, said system comprising:

a central computer at said network control center;

each node comprising a software-controlled intelligent switch controlling a plurality of trunk groups connected to at least one other node in said network to form links in said network constituting a network topology;

data link connecting said nodes to said central computer;

said network having a routing topology comprising a set of defined routes having one or more links between any two nodes of said network:

means to divide the operations of said network into time intervals:

each node having means to measure each of said nodes outgoing trunk group occupancy at the end of each time interval;

each node having means to measure each of said nodes arrivals for the duration of said time interval;

means to predict trunk occupancies of said network for a next succeeding time interval based on the trunk occupancies at the end of a preceding interval, the arrival rate of the preceding interval, the predicted arrival and departure rates for the next succeeding time interval, and said network topology;

means to calculate traffic control variables to allocate a percentage of predicted incoming traffic to each of said specified routes; and means to minimize blocked traffic in the event of predicted overloads, thereby effecting an access and control policy for said network.

11. The system of claim 10 wherein said time intervals are a function of an average holding time of traffic on said network.

12. The system of claim 10 wherein the time interval for a voice communication network is two times an average holding time of said system traffic.

13. The system of claim 10 wherein the time interval for a communication network having heterogeneous traffic types is the shortest of the average holding times of said traffic.

14. The system of claim 10 wherein said means to minimize includes:

means to weight projected traffic according to selected criteria; and means to minimize blocked traffic according to said weighting in the event of an overload.

15. The system of claim 10 wherein said network topology, said a priori defined routes, said routing topology and said traffic control variables are stored at said network control center.

16. The system of claim 10 wherein a sum of said traffic control variables for each source-destination pair of nodes lies on the real interval [0,1].

17. The system of claim 10 wherein each node sends a current state of each of said nodes outgoing trunk groups to said control center every ΔT time units.

18. The system of claim 10 with means to calculate actual arrival rates comprising:

each node transmitting to said network control center a number of service requests to all destination nodes during a preceding time interval.

19. The system of claim 10 wherein said means to predict the source-destination arrival rates of said network comprises:
    means to execute a second order linear predictor of the form $$\hat{\lambda}(t,t) = [1 - \alpha(t)]\hat{\lambda}(t,t-T) + \alpha(t)y(t)\frac{d}{dt}\hat{\lambda}(t,t) =$$

$$[1 - \beta(t)]\frac{d}{dt}\hat{\lambda}(t,t-T) + \beta(t)\frac{[y(t) - \hat{\lambda}(t-T,t-T)]}{T}$$

where
$\lambda(t)$ is the filtered estimate of $\lambda(t)$;
$\lambda(t,t-T)$ is the predicted estimate of $\lambda(t)$; and
$\alpha$ and $\beta$ are the Kalman Gains;
whereby a predictive estimate of the arrival rate for the succeeding time interval is a weighted sum of an estimate for the just completed preceding interval and the measured arrival rate for said immediately preceding interval.

20. The system of claim 19 wherein said means to predict the trunk group occupancies of said network comprises:

$$\hat{x}_i(t + \Delta t) = e^{-\mu\Delta t}z_i(t) +$$

$$(1 - e^{-\mu\Delta t})/\mu \sum_{sd\epsilon S}\left\{\hat{\lambda}_{sd}(t)\sum_{k=1}^{r_{sd}} u_{sd}^k(t)(\delta_{sd}^k)_i\right\}$$

$S = \{E$ numeraled set of network SD pairs$\}$ where $|S| = N$
where $Z_i(t)$ is the number of busy circuits on TG i at time t; $\hat{x}_i(t+\Delta t)$ is the predicted number of busy circuits on TG i; N is the total number of S-D pairs in the network; $\lambda_{sd}(t)$ is the arrival rate for the S-D pair sd during the following $\Delta t$ minutes; $r_{sd}$ is the number of route assigned to the pair sd; $u_{sd}^k(t)$, the $k^{th}$ control variable of the S-D pair sd, represents the proportion of the incoming sd traffic flow to be assigned to sd's $k^{th}$ route, during the upcoming control interval; and $(\delta_{sd}^k)_i$ is the indicator function.

21. The system of claim 20 wherein said means to minimize said blocked traffic comprises:
Minimize $$\sum_{sd\epsilon S} B_{sd}$$

Subject to $0 \leq \hat{x}_i(t+\Delta t) \leq cap_i$ with $i = 1, 2, \ldots, TG_{max}$ and $$\sum_{k=1}^{r_{sd}} u_{sd}^k(t) \leq 1, \text{ and } u_{sd}^k \geq 0,$$

22. The system of claim 20 wherein said means to minimize blocked traffic comprises:

Minimize $\sum_{sd\epsilon S} \frac{B_{sd}^2}{\hat{\lambda}_{sd}}$ Subject to $\sum_{sd\epsilon S} B_{sd} \geq -K + \sum_{sd\epsilon S} \hat{\lambda}_{sd}$.

23. The system of claim 22 having upper and lower bands defined as $$\sum_{sd\epsilon S}\left\{\hat{\lambda}_{sd}(t)(1 - e^{-\mu\Delta t})/\mu \sum_{k=1}^{r_{sd}} u_{sd}^k(t)(\delta_{sd}^k)_i\right\} \leq cap_i - e^{-\mu\Delta t}z_i(t)$$

and $$\sum_{sd\epsilon S}\left\{\hat{\lambda}_{sd}(t)(1 - e^{-\mu\Delta t})/\mu \sum_{k=1}^{r_{sd}} u_{sd}^k(t)(\delta_{sd}^k)_i\right\} \geq e^{-\mu\Delta t}z_i(t).$$

24. The system of claim 23 having control constraints defined as:

$$A(\hat{\lambda}_{sd})u \leq c(z_i),$$

where the vector u is a collection of traffic control variables scaled by matrix A; and
the vector c is an ensemble of constraint paramters.

25. The system of claim 10 wherein said means to minimize blocked traffic comprises means to minimize a weighted variance of the fraction of SD blocked calls defined as:

$$B_{sd} = \frac{\hat{\lambda}_{sd}\left\{-K + \sum_{sd\epsilon S}\hat{\lambda}_{sd}\right\}}{\sum_{sd\epsilon S}\hat{\lambda}_{sd}}.$$

26. A method for controlling access to and routing traffic through a network comprising a network control center and a plurality of nodes having a topology in which each node is connected to at least one other node by a link and is adapted to communicate via at least one link with each of the other nodes and with said network control center, said method comprising the steps of:
    generating a routing topology comprising a set of defined routes of one or more links between each source-destination pair of said nodes;
    dividing a period of operation of said network into time intervals;
    controlling the selection of routes between each source-destination pair of nodes from said set of corresponding defined routes, wherein the step of controlling said selection comprises the steps of:
    measuring a source-destination arrival rates for all of said routes during a first time interval;
    measuring the link occupancies for all of said links at the end of said first time interval;
    predicting the source-destination arrival rates for the next succeeding time interval;
    predicting link occupancies for all of said links at the end of the next succeeding time interval;
    specifying the percentage of incoming traffic to be offered to each defined route for each source-destination pair; and
    minimizing the percentage of traffic to be blocked from access to said network.

27. In a method for controlling access to and routing traffic through a network comprising a network control center and a plurality of nodes wherein each node is adapted to communicate via at least one link with each of the other nodes and with said network control center, said method comprising the steps of:

generating a routing topology comprising a set of defined routes between each source-destination pair of said nodes;

dividing the period of operation of said network into time intervals;

controlling the selection of routes between each source-destination pair of nodes from said set of corresponding defined routes by using calculated traffic control variables for said selection in response to current usage of said routes, the improvement in the calculation of said traffic control variables comprising the steps of:

predicting the coming arrival rates for the succeeding interval for all source-destination pairs in said network;

predicting the link occupancy level for all links in said network at a specified time in the succeeding interval; and formulating a routing for all incoming traffic in the succeeding time interval.

28. The method as recited in claim 27 wherein each route within a set of routes for a source-destination pair is assigned a calculated percentage of estimated incoming traffic, and the step of controlling includes the step of:

randomly allocating incoming traffic to specific routes within said set until each route has served each of said route's calculated percentage of said traffic.

29. An improved method for controlling access to and routing a call through a network switching system comprising a plurality of interconnected intelligent switches having a network topology and a network control center, wherein each switch is arranged to communicate via links with each of the other switches and with said control center, said method including the steps of:

generating a set of defined routes between each pair of switches, each route having at least one link:

controlling the selection of call routes between pairs of said switches from said sets as a function of current usage of the links of said routes, predictions of future arrivals on said links, and minimization of future blockings;

wherein for the improved method the step of controlling said selection comprises the steps of:

predicting occupancy factors for each link of each route of said sets of routes for an upcoming time interval based upon actual occupancy factors in the present time interval, actual arrivals during the present interval and predicted arrivals and departures for said upcoming time interval;

formulating an optimal routing strategy whereby predicted future traffic is allocated in calculated proportions to each route between said pairs of switches, while minimizing blocking of traffic.

30. A method for controlling access to and routing offered traffic through a network comprising a network control center and a plurality of intelligent switching nodes interconnected by links according to a defined topology, wherein each node is arranged to communicate with said center and said other nodes, said method comprising the steps of:

generating for use at preselected intervals a routing topology comprising sets of defined routes, each route composed of at least one link and each set including at least one route between each source-destination pair of nodes;

generating, at predetermined intervals, traffic control variables as a function of network topology, predictions of incoming traffic for the next interval based on actual traffic for the present interval, predictions of link occupancy for the next interval based on link occupancy for the first interval, and minimizing blocking based on blocking patterns of the present interval; whereby said traffic control variables include an allocation of traffic among alternate routes between all source-destination pairs;

controlling the selection of routes between each source-destination pair of nodes from said set of corresponding defined routes by using said generated traffic control variables for said selection in response to current usage of said routes;

said step of generating traffic control variables including the steps of predicting the coming arrival rates for all source-destination pairs in said network using a second order linear predictor of the form $$\lambda(t,t) = [1 - \alpha(t)]\lambda(t,t - T) + \alpha(t)\gamma(t)\frac{d}{dt}\lambda(t,t) =$$

$$[1 - \beta(t)]\frac{d}{dt}\lambda(t,t - T) + \beta(t)\frac{[\gamma(t) - \lambda(t - T, t - T)]}{T}$$

$\lambda(t)$ is the predicted arrival rate and $\gamma(t)$ is the measured arrival rate, such that the new predicted arrival rate for the upcoming interval is a weighted sum of the prior predicted arrival rate for the preceding interval and the arrival rate measured during the preceding interval; and predicting the link occupancy level for each link of said network at the end of next interval by measuring said link's present occupancy level, adding the predicted future arrivals on the link and subtracting the predicted future departures from the link.

31. The method as recited in claim 30 wherein said allocation of traffic among alternative routes between all source-destination pairs further includes the steps of:

dividing the interval between real numbers 0 and 1 into subintervals, the length of each subinterval corresponding to the magnitude of each traffic control variable of a particular source-destination pair;

generating a random number between 0 and 1 according to a uniform distribution;

selecting a route for a call based on the subinterval in which the value of the random number falls, thereby determining the route for said call.

* * * * *